(12) United States Patent
Hisano

(10) Patent No.: US 6,952,742 B2
(45) Date of Patent: Oct. 4, 2005

(54) EXTERNAL STORAGE DEVICE AND METHOD OF ACCESSING SAME

(76) Inventor: Tadahiko Hisano, 18-1 Hinomine, 4-chome, Kita-ku, Kobe-shi, Hyogo-ken (JP), 651-12

( * ) Notice: Subject to any disclaimer, the term of this patent is extended or adjusted under 35 U.S.C. 154(b) by 0 days.

(21) Appl. No.: 10/787,116

(22) Filed: Feb. 27, 2004

(65) Prior Publication Data

US 2004/0167994 A1 Aug. 26, 2004

Related U.S. Application Data

(62) Division of application No. 10/197,479, filed on Jul. 18, 2002, now Pat. No. 6,735,638, which is a division of application No. 09/644,650, filed on Aug. 24, 2000, now Pat. No. 6,557,047, which is a division of application No. 08/913,170, filed as application No. PCT/JP96/00519 on Mar. 5, 1996, now Pat. No. 6,138,173.

(30) Foreign Application Priority Data

| Mar. 6, 1995 | (JP) | 7-70452 |
| Aug. 16, 1995 | (JP) | 7-231975 |
| Oct. 4, 1995 | (JP) | 7-279866 |

(51) Int. Cl.[7] .......................................... G06F 13/14
(52) U.S. Cl. .................. 710/3; 710/13; 710/20; 710/33; 710/74; 710/300
(58) Field of Search ................. 710/2, 3, 13, 20, 710/33, 74, 300

(56) References Cited

U.S. PATENT DOCUMENTS

| 4,225,948 A | * | 9/1980 | Schuller | 365/239 |
| 4,377,972 A | | 3/1983 | O'Neil | |
| 4,667,088 A | | 5/1987 | Kramer et al. | |
| 4,817,940 A | | 4/1989 | Shaw et al. | |
| 5,196,994 A | | 3/1993 | Tanuma et al. | |

(Continued)

FOREIGN PATENT DOCUMENTS

| JP | A-60-215267 | 10/1985 |
| JP | A-63-29871 | 2/1988 |
| JP | A-63-110947 | 7/1988 |
| JP | A-3-241417 | 10/1991 |
| JP | U-6-25938 | 4/1994 |
| JP | A-6-149431 | 5/1994 |
| JP | A-7-028741 | 1/1995 |
| JP | A-7-56659 | 3/1995 |
| JP | A-7-175747 | 7/1995 |
| WO | WO 93/23811 | 11/1993 |

OTHER PUBLICATIONS

80186/80188 Intel User's Manual (Nov., 1994).

P. Oguic, "Carte E/S externe pour port parallel", Electronique Radio Plans, No. 567, Feb. 1, 1994, pp. 43–47.

B.J. Freeman et al. , "Microprocessor–to–microprocessor communications via an 8–bit data bus" IBM Technical Disclosure Bulletin., vol. 25, No. 10, Mar. 1983, pp. 5230–5235.

*Primary Examiner*—Rehana Perveen

(57) ABSTRACT

A storage device (200) has a memory and a circuit (100) which has a data input (Din), a control input (CTRL) and a data output (Dout), and provides an address input from the data input (Din) to the memory in accordance with a control signal from the control input (CTRL), so that the storage device (200) stores the data at the address in the memory or outputs data at the address in the memory to the data output (Dout). The apparatus provides the control signal to the control input (CTRL) from the interface (PORTS, P0, P1, P2), address and the data to the data input (Din) from the interface (PORTS, P0, P1, P2), to store the data at the address in the memory or to output data at the address in the memory to the data output (Dout). The apparatus may have a microcontroller (MPU) in which the interface (PORTS, P0, P1, P2) is provided.

39 Claims, 25 Drawing Sheets

U.S. PATENT DOCUMENTS

| | | |
|---|---|---|
| 5,218,686 A | 6/1993 | Thayer |
| 5,249,160 A | 9/1993 | Wu et al. |
| 5,269,015 A | 12/1993 | Shires |
| 5,313,618 A | 5/1994 | Pawloski |
| 5,319,755 A | 6/1994 | Farmwald et al. |
| 5,361,228 A | 11/1994 | Adachi et al. |
| 5,375,225 A | 12/1994 | Dean et al. |
| 5,381,043 A | 1/1995 | Kohiyama et al. |
| 5,418,952 A | 5/1995 | Morley et al. |
| 5,426,769 A | 6/1995 | Pawloski |
| 5,502,733 A | 3/1996 | Kishi et al. |
| 5,513,327 A | 4/1996 | Farmwald et al. |
| 5,524,231 A | 6/1996 | Brown |
| 5,526,320 A * | 6/1996 | Zagar et al. ............ 365/233.5 |
| 5,526,490 A | 6/1996 | Nishikawa |
| 5,548,741 A | 8/1996 | Watanabe |
| 5,625,777 A | 4/1997 | Takahashi et al. |
| 5,636,348 A | 6/1997 | Buxton et al. |
| 5,638,334 A | 6/1997 | Farmwald et al. |
| 5,651,138 A * | 7/1997 | Le et al. ............... 711/154 |
| 5,694,557 A | 12/1997 | Yang |
| 5,717,654 A * | 2/1998 | Manning ............ 365/233.5 |
| 5,740,404 A | 4/1998 | Baji |
| 5,841,580 A | 11/1998 | Farmwald et al. |
| 6,049,846 A | 4/2000 | Farmwald et al. |
| 6,378,020 B2 | 4/2002 | Farmwald et al. |
| 6,684,285 B2 | 1/2004 | Farmwald et al. |

\* cited by examiner

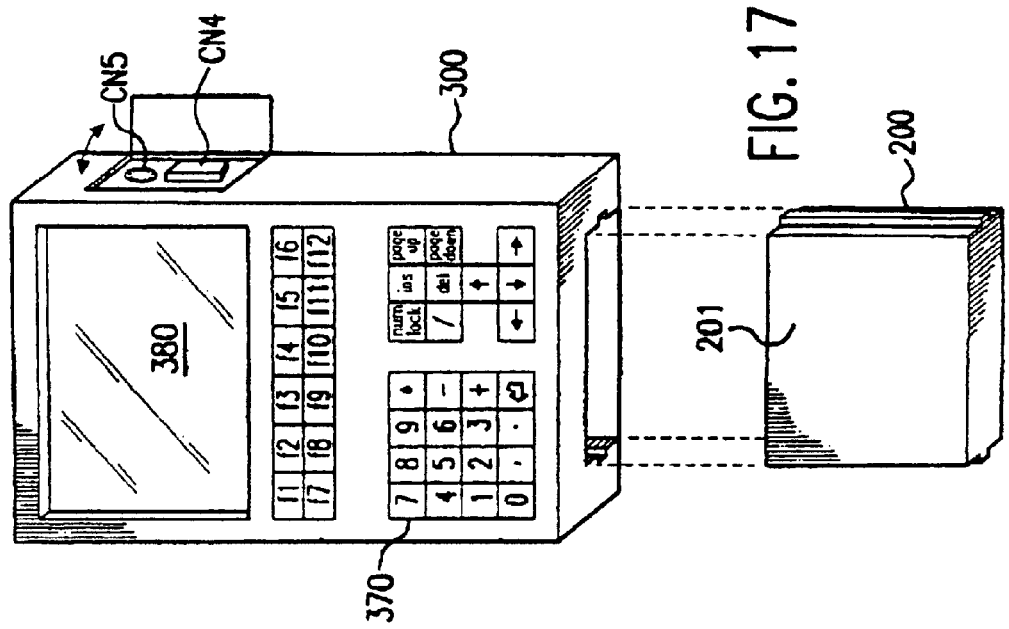
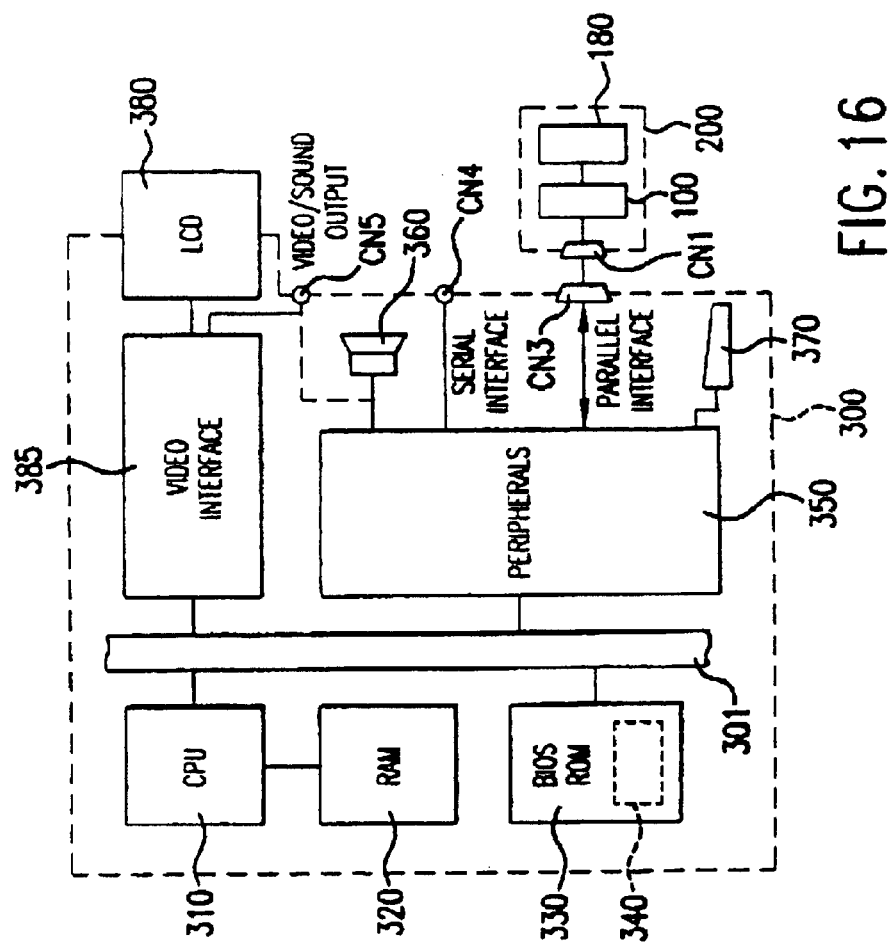

CONNECTION OF MICRO-CONTROLLER

EXTERNAL STORAGE DEVICE AND METHOD OF ACCESSING SAME

FIELD OF THE INVENTION

The present inventions are related to I/O expansion devices that enable a system thereof to expand inputs/outputs by connecting it to parallel interfaces of PC/AT or the PC/AT-compatible personal computers (or parallel input/output connectors equivalent to the parallel interfaces), and apparatus applied with I/O expansion devices and methods applied with the device and the apparatus.

BACKGROUND ART

As for desktop personal computers, their expansion is ordinarily carried out by inserting an expansion board in the body of the computers. As for the PC/AT or PC/AT-compatible personal computers, their expansion is ordinarily carried out to insert an expansion board based on so-called ISA bus standard into a bus slot. As for notebook-sized portable personal computers, an expansion board for the desktop personal computers can be installed by means of connecting an expansion box such as a docking-station.

Recently, the PCMCIA standard is established, and models that can be extended by inserting an IC card (called a PC card) suitable for this standard into the card slot are in the market.

In the case where the expansion is carried out by inserting the expansion board in the body like the desktop computers, a case of the body must be opened. This is troublesome and a difficult work for persons not having any knowledge of computer.

As for the portable personal computer, its advantage of portability was lost very much if it is connected to a docking-station, and extra expense is required to purchase the docking station.

An expansion method of inserting an IC card in accord with the PCMCIA standard into the card slot requires to purchase an expansion board for newly additional expansion, because a desktop computer does not ordinarily support the card slot. The PCMCIA standard has some restrictions of IC card size because it has been derived from the expansion memory cards. Therefore, the expansions with the IC card are limited.

To solve these problems, it is an object of the present inventions to provide I/O expansion devices for additional inputs and outputs without inserting the expansion board in the bus slot and inserting the IC card into the card slot, and apparatus and methods applying the devices.

And it is an object of the present inventions to apply for various uses and provide highly portable personal computers, by means of inserting into the body of the computers like the IC card to apply the I/O expansion device to them.

SUMMARY OF INVENTION

An I/O expantion device according to the present inventions enables to expand inputs and outputs of a personal computer by connecting it to a parallel interface of the personal computer, and includes a connector for connecting the inputs and outputs to a parallel interface; and an I/O expansion circuit connected to the connector, having data input to input four or five bit data in a first register equivalent to a data register in the parallel interface, data output to output four bit data to a second register equivalent to a status register in the parallel interface, and control input to input a signal from a third register equivalent to control register of a parallel interface, wherein the I/O expansion circuit has a plurality of four bit input/output ports and a four bit data bus for transferring data between these input/output ports and data input or data output, and outputs four bit data provided from the data input to one of the input/output ports or outputs four bit data provided from one of the input/output ports to the data output according to control from the control input.

The I/O expantion device according to one aspect of this invention is connected to the parallel interface of the personal computer,and inputs and outputs of the personal computer are allowed to be expanded by selecting one of the input/output ports according to the control the control input, and executing reading and writing of the selected input/output port.

An I/O expansion circuit according to the present inventions has a plurality of four bit input/output ports, a control input for inputting a signal for controling the operation of the circuit, a data input for a command for sellection of one of the input/output ports and read/write of the selected input/output port and 4-bit data to write, and a data output for outputting status of one of the input/output ports as 4-bit data, wherein the I/O expansion circuit has a write data bus for transferring data from the data input to the input/output ports, and a read data bus for transferring data from the input/output ports to the data input, a register, which is provided for each input/output port, for fetching and outputting status of the write data bus, and control circuit for fetching the command for selecting one of the input/output ports and setting operation mode in transition of a strobe which is one of control input, and the control circuit makes the status of the selected input/output port output from the data outputs when the fetched command is read mode, and makes 4-bit data provided to the input/output port in the returning transition of the strobe fetched into the register of the selected input/output port and output from the selected input/output port.

The higher speed operation is expected because this I/O expantion circuit comprises two unidirectional 4-bit data bus of the write data bus and the read data bus.

An external strage device according to the present inventions comprises a memory, is able to provide data stored in the memory to a personal computer via a parallel interface of the personal computer or store data from the personal computer, and comprises a connecter for connecting to the parallel interface, and an I/O expansion circuit having a data input for inputting four or five bits of a first register equivalent to a data register in the parallel interface, a data output for providing four bit of a second register equivalent to a status register in the parallel interface, and control input for inputing a signal from a third register equivalent to a control register via the connector, wherein the I/O expansion circuit comprises 4-bit inputs/outputs connected to an address pin, a data pin and a pin for control of the memory, and a 4-bit data bus for transferring data between the input/output ports and the data input or data output, and outputs 4-bit data provided to one of the input/output ports.

In the external storage device, emulating the operations of the memory by turning status of the input/output ports materializes access to the memory. In this way, The present invention provides an external storage device which is connectable to the parallel interface.

Methods for access to an external storage device according to present inventions to connect the external storage device to a parallel interface of a personal computer and to read data stored in a memory of the external storage device by means of writing data into a data register and a control register of a personal computer, included puting one of input/output ports of an I/O expansion circuit connected to data pins of a memory into read mode, setting address to write to the memory, making data written at the address to be output by writing 4-bit data to one of input/output ports of an I/O expansion circuit connected to pins for control of the memory, and reading the data in the memory by reading data output from one of input/output ports of an I/O expansion circuit connected to data pins of the memory.

According to this method for access to an external storage device, operation of the memory is emulated, so that it is successfully carried out to write data in the memory with the personal computer or to read data in the memory.

Methods for access to an external storage device according to present inventions to connect the external storage device to a parallel interface of a personal computer and to write data into a memory of the external storage device by means of writing data into a data register and a control register of a personal computer, setting address to write to the memory, setting data to be written to one of input/output ports of an I/O expansion circuit connected to data pins of the memory, writing the into the memory by operation of writing data at the address to be output by writing 4-bit data to one of input/output ports of an I/O expansion circuit connected to pins for control of the memory in sequence.

An I/O extension unit according to the present invention has the I/O expansion circuit wherein read/write of input/output ports is controlled by one bit of the control input that outputs 4-bits data from input/output port by writing the 4-bit data provided from the data input to the input/output ports selected by the remaining three bits of the control input, or may output 4-bit data provided to the input/output ports selected by the remaining three bits of the control input to the data output.

In this I/O extension unit, read/write of the input/output ports are controlled by one bit of the control input, one of the input/output ports is selected by remaining three bits, and 4-bit data from the data input is written to corresponding input/output port or4-bit data provided to corresponding input/output port is output to the data output, so that higher speed operation is successfully realized.

A computer according to the present inventions is characterized in having a parallel interface and that a program for access to an external storage device as a drive when the external storage device is connected to the parallel interface is written in a ROM of the computer.

And a computer according to the present inventions having a microcontroller formed on monolithic intergrated circuit with a parallel interface which input and output at least 4-bit data and a ROM which stores a program for operating the microcontroller, wherein the parallel interface is connectable to a storage device having a memory and an I/O external circuit which can exchange at least 4-bit data between the parallel interface and the memory, address selection and control of the memory through the I/O expansion circuit and exchange of data at desired address of the memory is carried out by the program written in the ROM.

BRIEF DESCRIPTION OF DRAWINGS

FIG. 16 shows an internal structure of the personal computer using the storage device which is made by connecting the memory to the I/O expansion circuit enumarated in the embodiments.

FIG. 17 shows an example of appearance of the personal computers shown in FIG. 16.

DETAILED DESCRIPTION OF PREFERRED EMBODIMENTS

The parallel interface will be first described since the present inventions enable expansion by use of a parallel interface of PC/AT or PC/AT-compatible personal computers.

Figure 1:
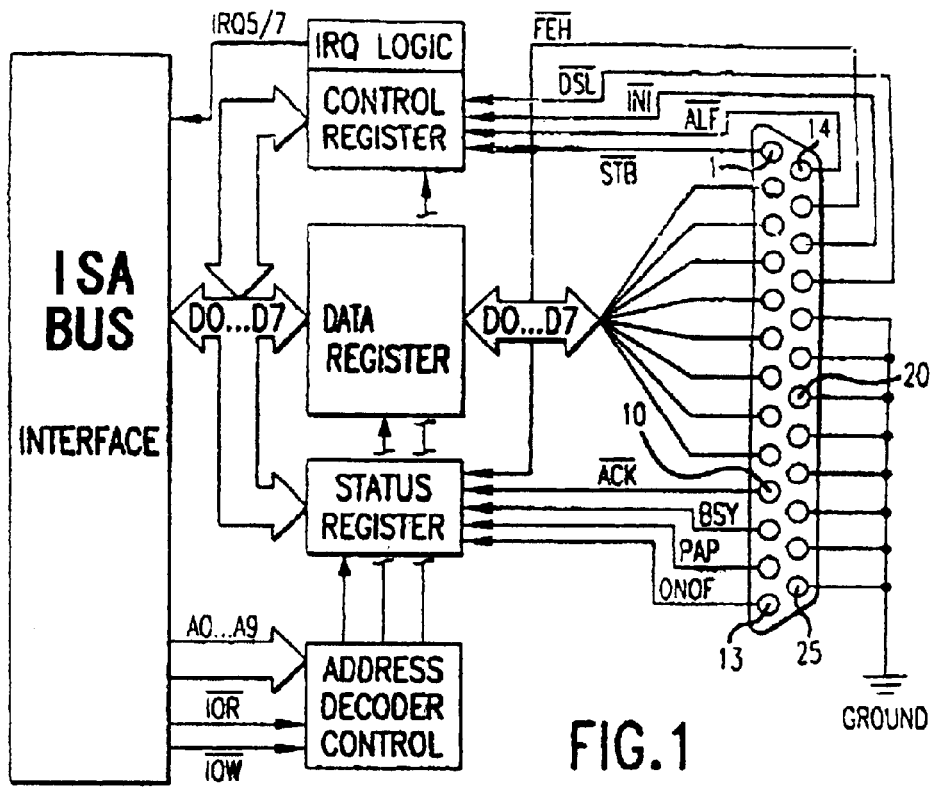
FIG. 1 shows the architecture of the parallel interface in the personal computer.

The parallel interface is called a printer port because it is used for connection with a printer, and it is described in the "Technical Reference Personal Computer AT" issued from IBM Incorporated. FIG. 1 shows the architecture of the parallel interface in the personal computer.

A DSUB connector (female) with twenty-five pins is ordinarily used for the parallel interface through which 8-bit parallel data can be output to an external apparatus of the personal computer. The parallel interface has three registers of data register(Data Register), status register(Status Register), and control register(Control Register), these are connected to an ISA bus that is the PC interface of the mother board of the personal computer, and these are accessible from a CPU not shown. The data register and the control register are designed to execute both write and read from the CPU, and the status register is designed to execute read only.

The status of the data register are output from pins 2 to pin 9 of the DSUB connector, and the signals of the pins 2 to 9 are named D0 to D7 respectively. The status of bits 0 to 3 in the control register are inverted except bit 2 and are output to pins 1, 14, 16, and 17 of the DSLUB connector. These signals are named STB, ALF, INI, and DSL and the remaining bits 4 to 7 are reserved. Bits 3 to 7 in the status register indicate the status of pins 15, 13, 12, 10, and 11 of the DSUB connector. Bit 7 indicates the inverted status. These signals are named FEHI, OFO, PAP, /ACK, and BSY, and the remaining bits 4 to 7 are reserved. Setting the value of bit 6 (pin 10 of the DSUB connector, signal /ACK) to "L" enables an interrupt of IRQ5 or IRQ7, and whether the interupt is enabled or disabled is controlled with bit 4 in the control register. The circuit for this control (IRQ logic) is equipped.

The address of the data register is set to one of 378H, 278H, and 3BCH ("H" denotes a hexadecimal number), the address of the status register is equal to the sum of 1 and the address of the data register, and the address of the control register is equal to the sum of 2 and the address of the data register. Any one of the above registers are accessed by means of designation of these addresses from the CPU. An address decode control circuit (Address Decode Control) shown in the figure controls input/output processing of each register as described above on the basis of address (A0 to A9) and read/write control signals (IOR, TOW) output from the CPU.

The PC/AT is capable of writing 8-bit data to the data register and output 8-bit parallel data from the computer to an external device. But the written data is merely read from the data register, and therefore bidirectional 8-bit data transmission is impossible. Some PC/AT-compatible personal computers and PS/2 are capable of carrying out biderectional 8-bit data transmission, using the data register. However it is only the status register that can input data from an external device via the parellel interface for any PC/AT or its compatible personal computer.

In consideration of the afore-mentioned matters, on object of the I/O expansion device of the present inventions is to enable expansion of inputs and outputs for any PC/AT or PC/AT-compatible personal computer by connecting it to a parallel interface.

Figure 2:
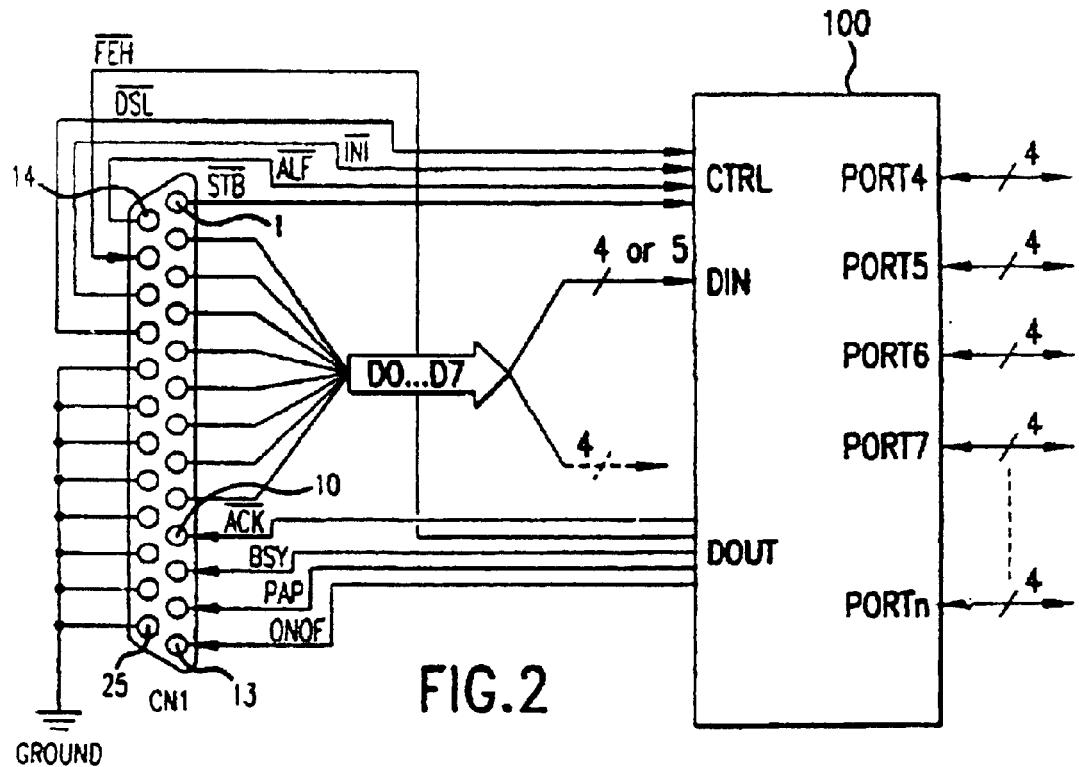
FIG. 2 shows an architecture of the I/O expansion device of the present invention.

FIG. 2 shows an example of configuration of the I/O expansion device of this invention.

The I/O expansion device has connector CN1 (including a card edge connector, hereinafter similarly) for connection with the parallel interface of the body of the personal computer and I/O expansion circuit 100 having a plurality of 4-bit data input/output ports (PORT 4, PORT 5, . . . PORT n).

Four of pins 2–9 (signal lines D0–D7 from the data register) in the connector CN1 are respectively connected to the data input DIN of the I/O expansion circuit 100. Through this the data input DIN, the I/O expansion circuit 100 inputs the 4-bit parallel signal transferred from the data register in the personal computer body via the connector CN1. In the case where parity is contained, the data input DIN of the I/O expansion circuit has a width of five bits and are respectively connected to five bits of the signal lines D0–D7.

Pins 11–13, and 15 (signal lines /FEH, BSY, PAP, and ONIOF to the status register) of the connector CN1 are respectively connected to 4-bit data output DOUT of the I/O expansion circuit 100. The I/O expansion circuit 100 is provided to output 4-bit parallel signal from the 4-bit data output DOUT to the status register of the personal computer via a specific pin of the connector CN1. In the case where a hardware interrupt signal is provided to the personal computer or the parity of the 4-bit parallel signal is contained, another output of the data output DOUT is connected to signal line/ACK and is provided to bit 6 of the status register via pin 10 of the connector CN1. In this case, the interrupt is active-low.

Required pins among the pins 1, 14, 16, and 17 (signal lines /STB, /ALF, /INI, and /DSL from the control register) of the connector CN1 are connected to control input CTRL, of the I/O expansion circuit 100. One of their pins is connected to strobe pin PROG of the I/O expansion circuit 100. Transition of the strobe pin PROG from the initial status causes I/O expansion circuit 100 to input a command from the data input DIN. According to this command, one of ports 4-n is selected and the selected port is put into the write or read mode. In the case of the read mode, the status of all pins of the selected port is output to data output DOUT. In the case of the write mode, providing data to be written into the selected port to the data input DIN, the transition of strobe PROG returning to the initial status causes the data to be written to be output to all pins of the selected port.

Another one of signal lines /STB, /ALF, /INI, and /DSL from the control register is connected to pin /EN for controlling whether a signal to the 4-bit the data input DIN is valid or invalid. To validate the signal sent to the 4-bit the data input DIN, it must be controled so that the signal becomes valid by pin /EN.

In FIG. 2, operation of the I/O expansion circuit 100 is controlled by the status of bits 0, 1, and 3 in the control register, and the strobe PROG is controlled by the value of bit 2.

The rest of pins 2 to 9 (signal lines D0 to D7 from the data register) of the connector CN1 are connected to the power supply line to the I/O expansion circuit 100 or, if necessary, the control input CTRL of the I/O expansion circuit 100, and are used for power supply or control of circuit.

Figure 3A:
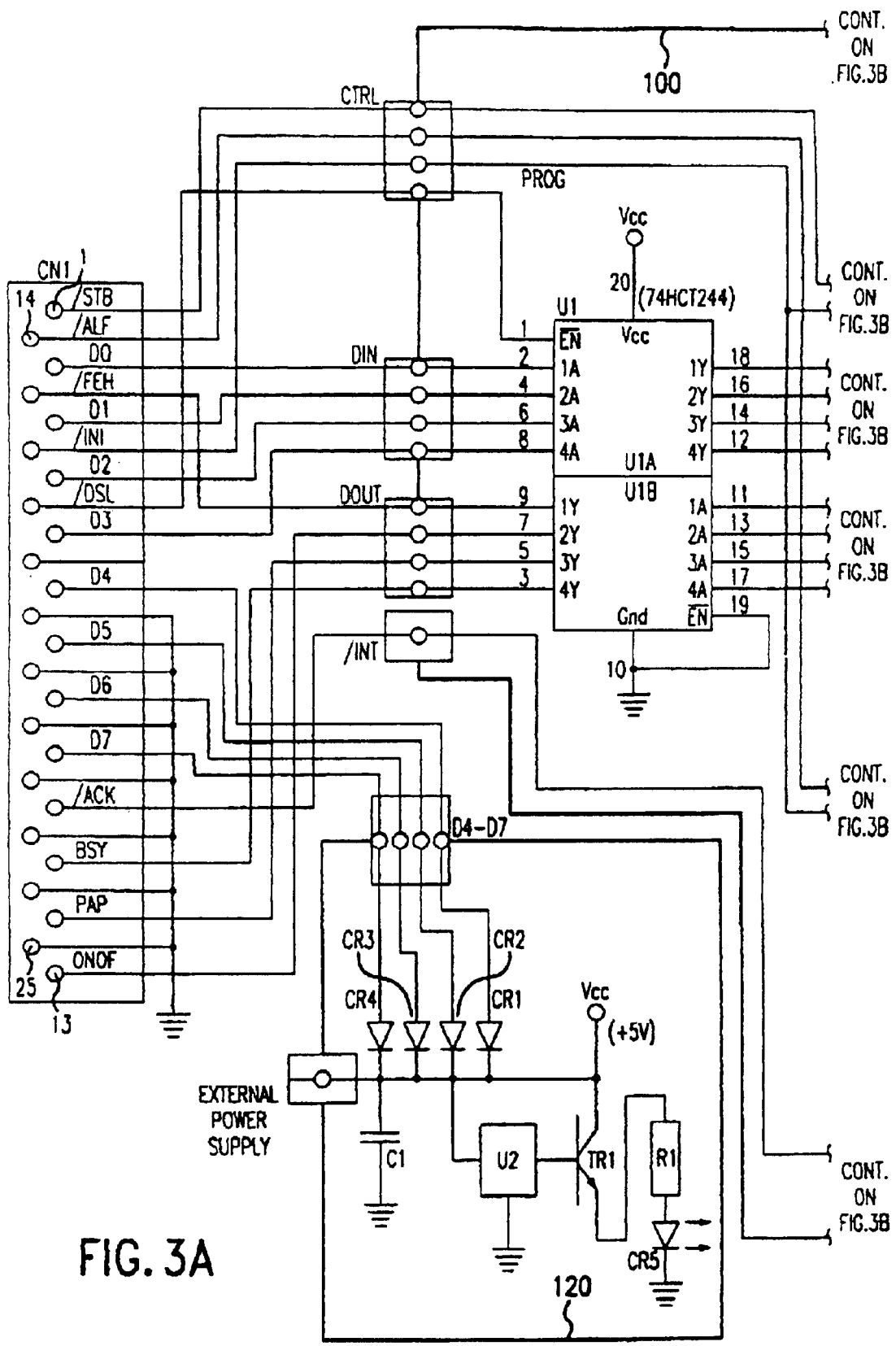
FIG. 3 shows a specific example of the I/O expansion device of the present inventions.
Figure 3B:
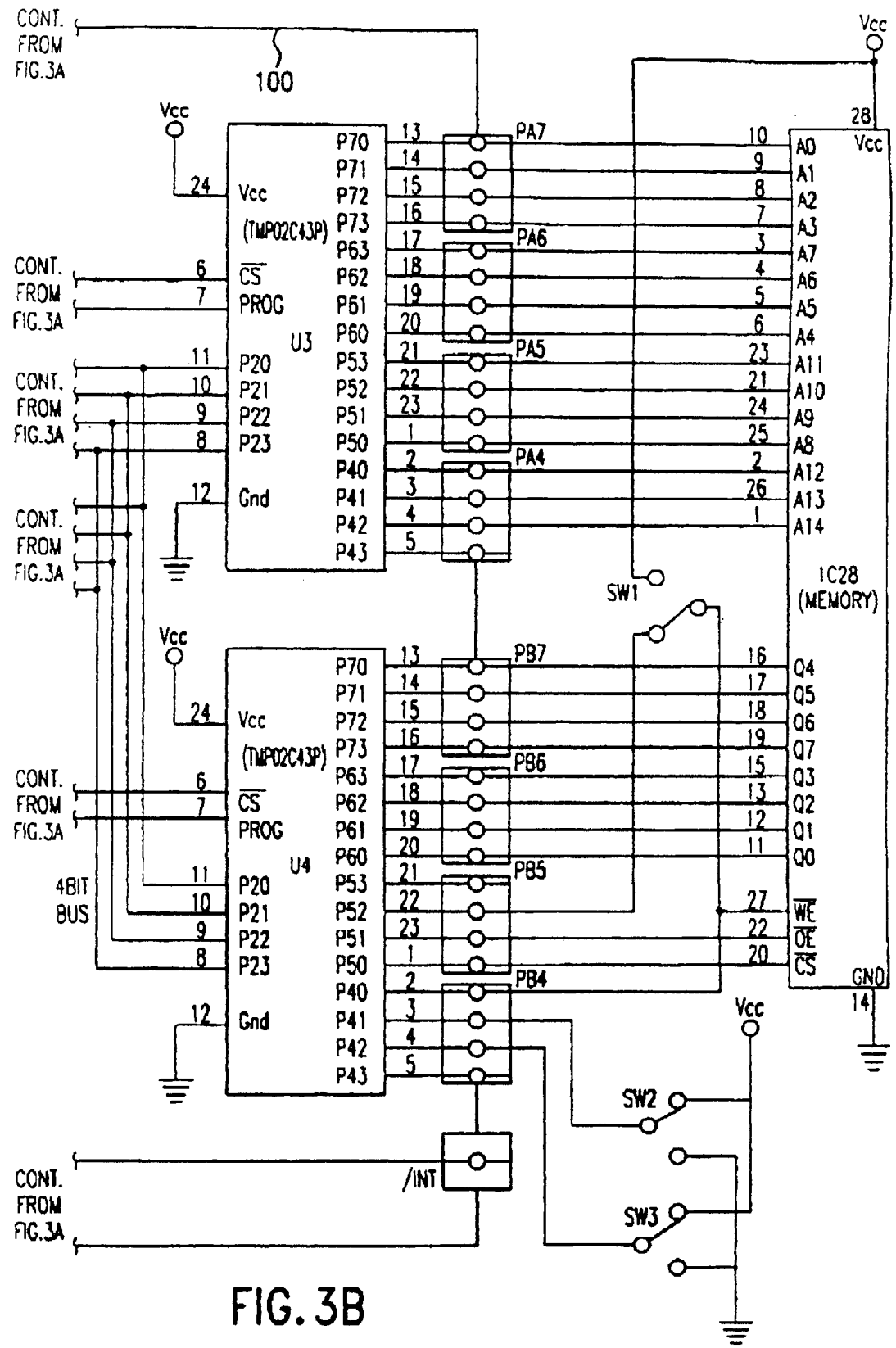

FIG. 3 shows a specific example of the I/O expansion device of the present inventions. This is the simplest example of architecture of an I/O expansion device where easy available ICs (4-bit bus buffers U1A and U1B, IO expanders U3 and U4) are used and they are connected to a bidirectional 4-bit bus.

FIG. 3 also shows an application as a simple external storage device in which memory IC 28 is connected through ports PA1–PA7 and PB1–PB7 of the I/O expansion circuit 100.

Table 1 lists the connection of the registers in the parallel interface, connector CN1, and I/O expansion circuit shown in the figure. In this table, the registers in the parallel interface (register names, bit numbers) and signal names (signal name), the connector CN1 pin numbers (pin No.), destinations of signals (Destination), and connections with bus buffers U1A and U1B, and IO expanders U3 and U4 are shown aligned from the right of table 1. Arrow "-->" indicates the output from the computer body to the I/O expansion device shown in the figure, and arrow "<--" indicates the input from the I/O expansion device shown in the figure to the computer body.

TABLE 1

| register name bit No. (signal name) | pin No | Destination | Connection |
|---|---|---|---|
| Data register | | | |
| 0 (D0) | 2 | --> | U1A P20 of U3, U4 |
| 1 (D1) | 3 | --> | U1A P21 of U3, U4 |
| 2 (D2) | 4 | --> | U1A P22 of U3, U4 |
| 3 (D3) | 5 | --> | U1A P23 of U3, U4 |
| 4 (D4) | 6 | | CR1 for +5 V |
| 5 (D5) | 7 | | CR2 for +5 V |
| 6 (D6) | 8 | | CR3 for +5 V |
| 7 (D7) | 9 | | CR4 for +5 V |
| Status register | | | |
| 3 (/FEH) | 15 | <-- | U1B P20 of U3, U4 |
| 4 (OFON) | 13 | <-- | U1B P21 of U3, U4 |
| 5 (PAP) | 12 | <-- | U1B P22 of U3, U4 |
| 6 (/ACK) | 10 | <-- | EXTERNAL INTERRUPT |
| 7 * (/BSY) | 11 | <-- | U1B P23 of U3, U4 |
| Control register | | | |
| 0 * (STB) | 1 | --> | /CS of U3 |
| 1 * (ALF) | 14 | --> | /CS of U4 |
| 2 (/INI) | 16 | --> | PROG of U3, U4 |
| 3 * (DSL) | 17 | --> | /EN of U1A |
| 4 IRQ frag | | | |

* Inverted input or output

Inputs 1A to 4A of the 4-bit bus buffer U1A are equivalent to the data input DIN of the I/O expansion circuit 100. These are connected to pins 2 to 5 of the connector CN1 for connection with the parallel interface and provided the signals D0 to D3 in lower four bits of the data register. Gate control pin /EN of the bus buffer U1A is equivalent to a pin for controlling whether the signal sent to the data input DIN of the I/O expansion circuit 100 is valid or invalid. This pin is connected to pin 17 of the connector CN1 and provided with a signal DSL of bit 3 in the control register. Signals D0 to D3 are provided to ports P20 to P23 of the IO expanders U3 and U4 via the bus buffer U1A and 4-bit bus only when the status of bit 3 in the control register is 1 (pin 17 is put into "L").

Outputs 1Y to 4Y of 4-bit bus buffer U1B are equivalent to the 4-bit data output DOUT of I/O expansion circuit 100. These are connected to pins 15, 13, 12, and 11 (signals /FEH, OFON, PAP, and /BSY) of the connector CN1, and provide the status of ports (P20 to P23) of the IO expanders U3 and U4 to bits 3, 4, 5, and 7 in the status register of the personal computer respectively through the 4-bit bus buffer U1A. Pin 10 (signal /ACK) of the connector CN1 is connected to an interrupt input (/INT) from an external device, and the status of the interrupt input (/INT) is provided to bit 6 of the status register. In this case, the interrupt signal (/INT) is active-low.

The gate control pin /EN of the bus buffer U1A and pins CS and PROG of the 10 expanders U3 and U4 is equivalent to the control input CTRL of the I/O expansion circuit 100. Details of each pin of the IO expanders and their commands are described in the User's Manual issued from Intel Incorporated or its compatible chip manufacturer.

Pins /CS and PROG of the IO expanders U3 and U4 are connected to bits 0, 1, and 2 (signals STB, ALF, and /INI) in the control register via pins 1, 14, and 16 of the connector CN1. Pin /CS of the IO expanders U3 and U4 is the chip select input, and no data can be output and the internal status cannot be modified at all when this pin is put into "H". This pin is for control of the operation of the I/O expansion circuit 100, that is, for controling whether a signal to the data input DIN is valid or invalid. When the pin 1 is put into "I" (bit 0 in the control register ), the IO expander U3 is selected. When the pin 1 is put into "L" (bit 0 in the control register="1"), the IO expander U3 is selected. When the pin 14 is put into "L" (bit 1 in the control register="1"), the IO expander U4 is selected.

The pin PROG of IO expanders U3 and U4 is equivalent to strobe pin PROG of the I/O expansion circuit 100. The pins /CS and /EN are put into "L" and the strobe pin PROG is put from "H" into "L", so that a command via the data input DIN is fetched. The upper two bits in the command are assigned for selection of ports in the IO expander (see Table 3) and the lower two bits are assigned for seting a mode of the selected port.

The operations of the IO expanders U3 and U4 are controlled by the status of bits 0, 1, and 2 in the control register. The strobe pin PROG is controlled by the status of bit 4 in the control register.

TABLE 2

| BIT | | SELECTED |
|---|---|---|
| 1 | 0 | PORT (PIN No.) |
| 0 | 0 | PORT4 (P40–43) |
| 0 | 1 | PORT5 (P50–53) |
| 1 | 0 | PORT6 (P60–63) |
| 1 | 1 | PORT7 (P70–73) |

TABLE 3

| BIT | | |
|---|---|---|
| 3 | 2 | MODE |
| 0 | 0 | READ |
| 0 | 1 | WRITE |
| 1 | 0 | ORLD |
| 1 | 1 | ANLD |

For example, when the command is "20H", port 6 (P60–P63) is selected and put into the read mode (READ). The status of the port 6 is output to outputs 1Y to 4Y in the bus buffer U1B and provided to the status register of the personal computer body. When the command is "01H", port 4 (P40–P43) is selected and put into write mode (WRITE). The data to be written into the selected port is output from inputs 1A to 4A in bus buffer U1A and strobe PROG is returned from "L" to "H", so that data to be written is output to all pins of the port 4.

Pins 6 to 9 of the connector CN1 are connected to the power supply line (+5V) via Schottky barrier diodes CR1 to CR4. Power for this I/O expansion circuit may be supplied by an external device, and such power supply and control therefor are performed by the personal computer body because the power consumption is reduced. Setting the upper four bits D4 to D7 in the data register to "1" and pins 6 to 9 to "Ht" the power is supplied. Setting pins 6 to 9 to "L", supply of the power is stopped. Capacitor C1 is connected between the power line (+5V) and ground line to reduce repples.

A power monitor circuit is also connected between the power line (+5V) and ground line. This power monitor circuit is used for monitoring whether the voltage of the power line (+5V) is favorable, and can be arranged with power reset IC (U2), transistor TR1, resistor R1, and light emitting diode CR5 as described in the figure. The power monitor circuit shown in the figure lights light emitting diode CR5 to indicate that the voltage of the power line (+5V) is favorable when it exceeds the voltage determined by the power reset IC (U2). These circuits constitute power circuit section 120.

Ports P40–P43, P50–P53, P60–P63, and P70–P73 of the IO expanders U3 and U4 are respectively equivalent to input/output ports of the I/0 expansion circuit 100. In this explanation, these ports are labeled with symbols PA4, PA5, PA6, PA7, PB4, PB5, PB6, and PB7. An algorithm for the personal computer body to output data to a specified port is realized by controlling the signal to the control input of the I/O expansion circuit 100 as shown in table 4.

TABLE 4

| state | /CS | PROG | /EN | DOUT |
|---|---|---|---|---|
| 0 | L | H | L | |
| 1 | L | H | L | COMMND SET |
| 2 | L | L | L | |
| 3 | L | L | L | 4BIT DATA SET |
| 4 | L | H | L | |

The algorithm for the personal computer body to input data from the specified port of the IO expanders U3 and U4 is realized by controlling the signal of the control input of the I/O expansion circuit 100 as table 5.

TABLE 5

| state | /CS | PROG | /EN | DOUT, DIN |
|---|---|---|---|---|
| 0 | L | H | L | |
| 1 | L | H | L | COMMND SET |
| 2 | L | L | L | |
| 3 | L | L | H | |
| 4 | L | L | H | DATA READ |
| 5 | L | H | L | |

On the circuit configuration shown in FIG. 3, operation of output to the ports is executed as follows. First, set "0111" to the upper four bits of the control register, "0" bit 3, and "1" to bit 2, and "1" to bit 0 if the IO expander U3 is written or set "1" to bit 1 if the IO expander U4 is writen (Status 0 in Table 4). Keeping the upper four bits of the data register "1111", set the write command of the desired port to the lower four bits (Status 1 in Table 4). Next, set "0" to bit 2 of the control register (Status 2 in Table 4). Keeping the upper four bits of the data register with "1111", set the data to be written to the lower four bits (Status 3 in Table 4). Then set "1" to bit 2 in the control register (Status 4 in Table 4).

This processing can be programmed with a computer language such as Assembler, C language and so on. This processing programed with Assembler is shown as follows (variable "port" is set one of values 0H to U3 according to Table 2; variable "chip" is set one of values OH or 1H according to the U3 or U4; variable "prt_port" is set one of the parallel interface addresses.

```
MOVE AL, chip
OR AL, ECH
OUT (prt_port+2), AL
MOVE AL, port
OR AL, F4H
OUT prt_port, AL
MOVE AL, chip
OR AL, E8H
OUT (prt_port+2), AL
MOVE AL, write_data
OR AL, FOH
OUT prt_port, AL
MOVE AL, chip
OR AL, ECH
OUT (prt_port+2), AL
```

On the circuit configuration shown in FIG. 3, the operation of input from the port is executed as follows. First, set "0111" to the upper four bits of the control register, "0" to bit 3, and "1" to bit 2, and set "1" to bit 0 if IO expander U3 is written or set "1" to bit 1 if IO expander U3 is writen (Status 0 in Table 5). Keeping the upper four bits of the data register "1111", set the read command of the desired port to the lower four bits (Status 1 in Table 5). Next, set "0" to bit 2 of the control register (Status 2 in Table 5). Set "1" to bit 3 of the control register (Status 3 in Table 5). Read and store the status of the status register (Status 4 in Table 5). Set "0" to bit 3 of the control register and "1" to bit 2 (Status 5 in Table 5).

This processing can also be programmed with a computer language such as the assembler, C language and so on. This processing programed with the assembler is shown as follows (data read from the port is stored in AL register).

```
MOVE AL, chip
OR AL, ECH
OUT (prt_port+2), AL
MOVE AL, port
OR AL, FOH
OUT prt_port, AL
MOVE AL, chip
OR AL, E8H
OUT (prt_port+2), AL
MOVE AL, chip
OR AL, E8H
OUT (prt_port+2), AL
MOVE AL, chip
OR AL, EOH
OUT (prt_port+2), AL
IN AL, (prt_port+1)
MOVE BL, AL
MOVE AL, chip
OR AL, ECH
OUT (prt_port+2), AL
SHR BL, 3
```

```
AND BL, 07H
NOT AL
SHR AL, 4
AND AL, 08H
OR AL, BL
```

As described above, this I/O expansion device inputs a command from the data input DIN with the transition of strobe PROG from the initial status according to the control from the control register, so that the specified port is put into the write or read mode. In the read mode, the status of the selected port is made to be output to data output DOUT. In the write mode, the data provided to the data input DIN is made to be output to the selected port. In other words, any personal computer with a parallel interface enables access to the desired one of the plural ports of the I/O expansion circuit 100 like the one-chip microcontroller.

Thus the input/output expansion is realized by increasing input/output pins of the personal computer via the parallel interface. In this case, not only relays can be connected with some ports of the I/O expansion device for sequence control but also various hardware products can be connected with them for operation.

FIG. 3 shows a specific example of architecture of the storage device using memory IC 28. DRAMs, SRAMs, EEPROMs, flash memories, ferroelectrics memories and so on may apply to memory IC 28. Emulating the operations of writing and reading it by the above-mentioned algorithm for accessing the ports materializes reading and writing for the memory IC 28.

Figure 4:
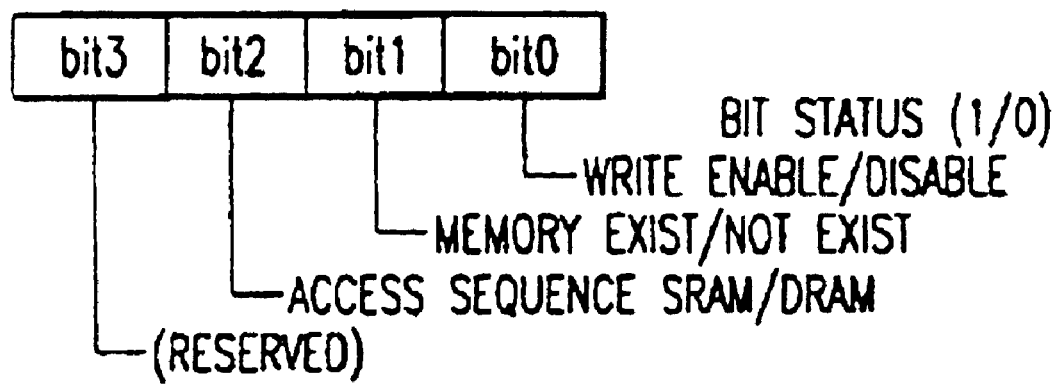
FIG. 4 shows the relation between the status of each bit in port PA4 of I/O expansion circuit 100 and identification of the connected memory.

Ports P41–P43 of IO expander U4 are connected to switches SW1–SW3, and the status of each switch is read from the ports, so that the connected memory is identified. Switch SW1 is connected to pin /WE for the control of the writing memory IC 28, and can inhibit operation of writing. Switch SW2 works for identifying whether some memory is connected. Switch SW3 works for identifying whether the access type is DRAM type or SPRAM type. FIG. 4 shows the relation between status of each bit in port PA4 of I/O expansion circuit 100 and identification of the connected memory, as an example. In this example, it is distinguishable whether the memory can be written (bit 3), the memory access sequence is SRAM or DRAM mode (bit 2) and some memory is connected (bit 1).

Figure 5:
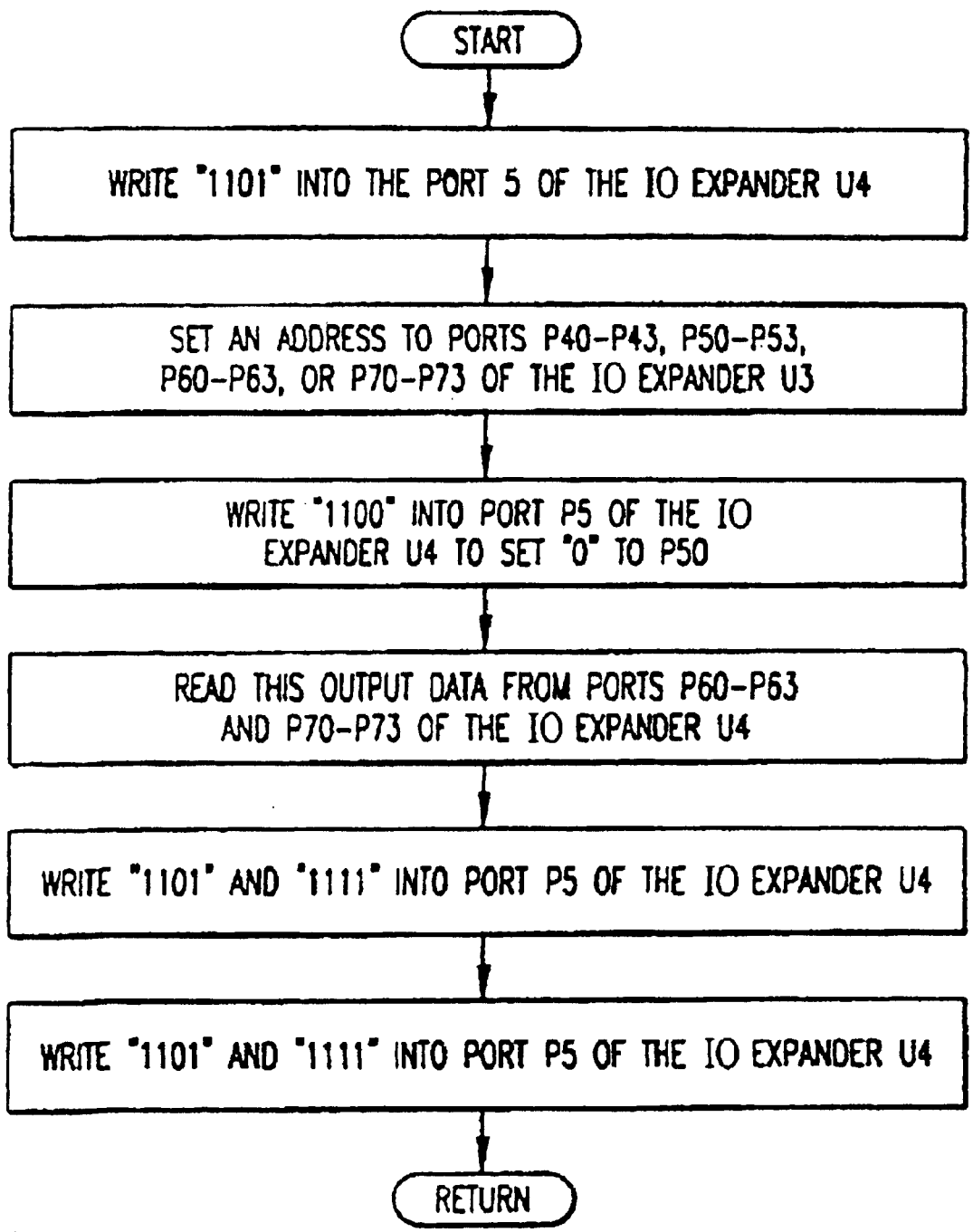
FIG. 5 shows an example in which operation of reading data is carried out byte by byte in the case that the SRAM or EEPROM is applied to the memory.
Figure 6:
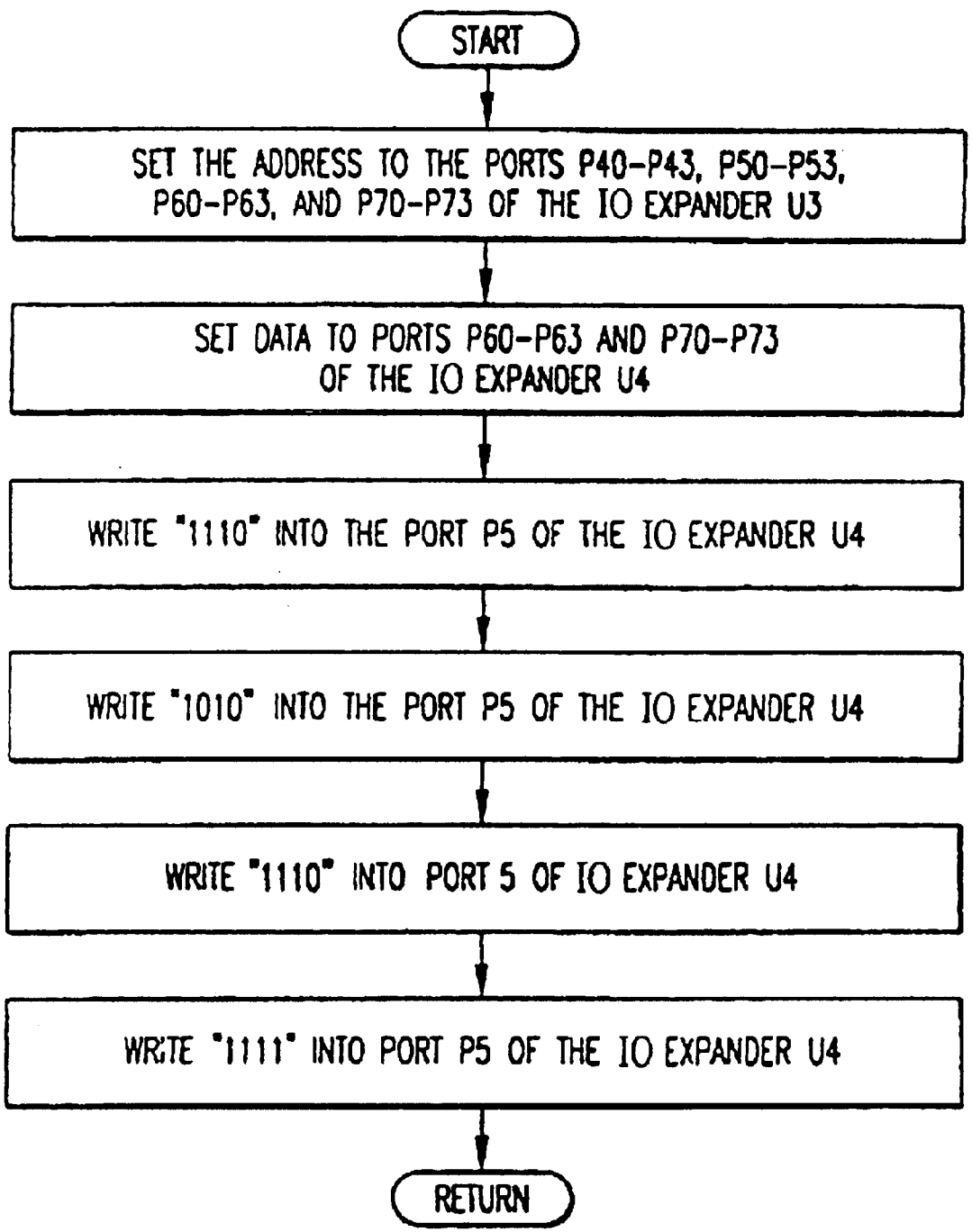
FIG. 6 shows an example in which operation of writing data is carried out byte by byte in the case that the SRAM or EEPROM is applied to the memory.

Flowcharts shown in FIG. 5 and FIG. 6 are an example in which reading and writing data are carried out byte by byte by the above-mentioned operation of accessing the ports that data is written into the data register and the control register of the personal computer and data is read from the status register. And this is an example that SRAM or EEPROM is applied to the memory IC 28 in the circuit shown in FIG. 3. The memory IC 28's pins A0 to A14 for the address input, pins Q0 to Q7 for data input/output, pins/CS, /OE, and /WE for control are connected to ports of 10 expanders U3 and U4 respectively.

The operation of reading data is successfully executed as follows. Put ports P60–P63, and P70–P73 of the 10 expander U4 connected to data pins Q0–Q7 of the memory into the read mode, and write "1101" into the port 5 of the IO expander U4 connected to pins /CS, /OE, and /WE for controlling memory to set "1" to P50 and P52 and "0" to P51. Then the pins /CS and /OE are put into the status "H" and the pin /WE is put into the status "L". Next, set an address to ports P40–P43, P50–P53, P60 –P63, or P70–P73 of the IO expander U3 connected to address pins A0–A13 of the memory to be written. The address is provided to pins A0–A14. And write "1100" into port P5 of the IO expander U4 to set "0" to P50. The pin /CS is put into the status "L" and the address is fetched into memory IC 28. The data at the address of the memory IC 28 is output to pins Q0–Q7. Read this output data from ports P60–P63 and P70–P73 of the IO expander U4. Write "1101" and "1111" into port P5 of the IO expander U4 in sequence to set "1" to the P50 and P52, then the pins /CS, /OE/ and /WE are put into the status "H" of the initial status.

The write operation is successfully executed as follows. Put each port of the IO expanders U3 and U4 into write mode, and set the address to the ports P40–P43, P50–P53, P60–P63, and P70–P73 of the IO expander U3. And set data to ports P60–P63 and P70–P73 of the IO expander U4. It is equivalent that the alternate of these steps is done for the first. Next, Write "1110" into the port P5 of the IO expander U4 to set "0" to P50. The pin /WE is put into status "L". Write "1010" into the port P5 of the IO expander U4 to set "0" to P52. The pin /CS is put into status "L" and the address is fetched into memory IC 28. And write "1110" into port 5 of IO expander U4 to set "1" to P52. The pin /CS is put into status "H". The data set to the ports P60 to P63 and P70 to P73 of IO expander U4 is fetched at the address in the memory IC 28. Write "1111" into the port P5 of the IO expander U4 to set "1" to the P50 and to make the pins /CS, /OE, and /WE put into status "H" of the initial status. If EEPROM is applied to the memory IC 28, a specific interval is required until the next access.

In the case of successively accessing, it is only modified parts of the addresses to be set to the ports P40–P43, P50–P53, P60–P63, or P70–P73 of the IO expander U3. For example, to access the address IH after writing at the address 0H, only "0001" is required to be set to the port PA7. The memory that supports the burst mode brings reading data at higher speed by turning the status of pin /CS.

Figure 7A:
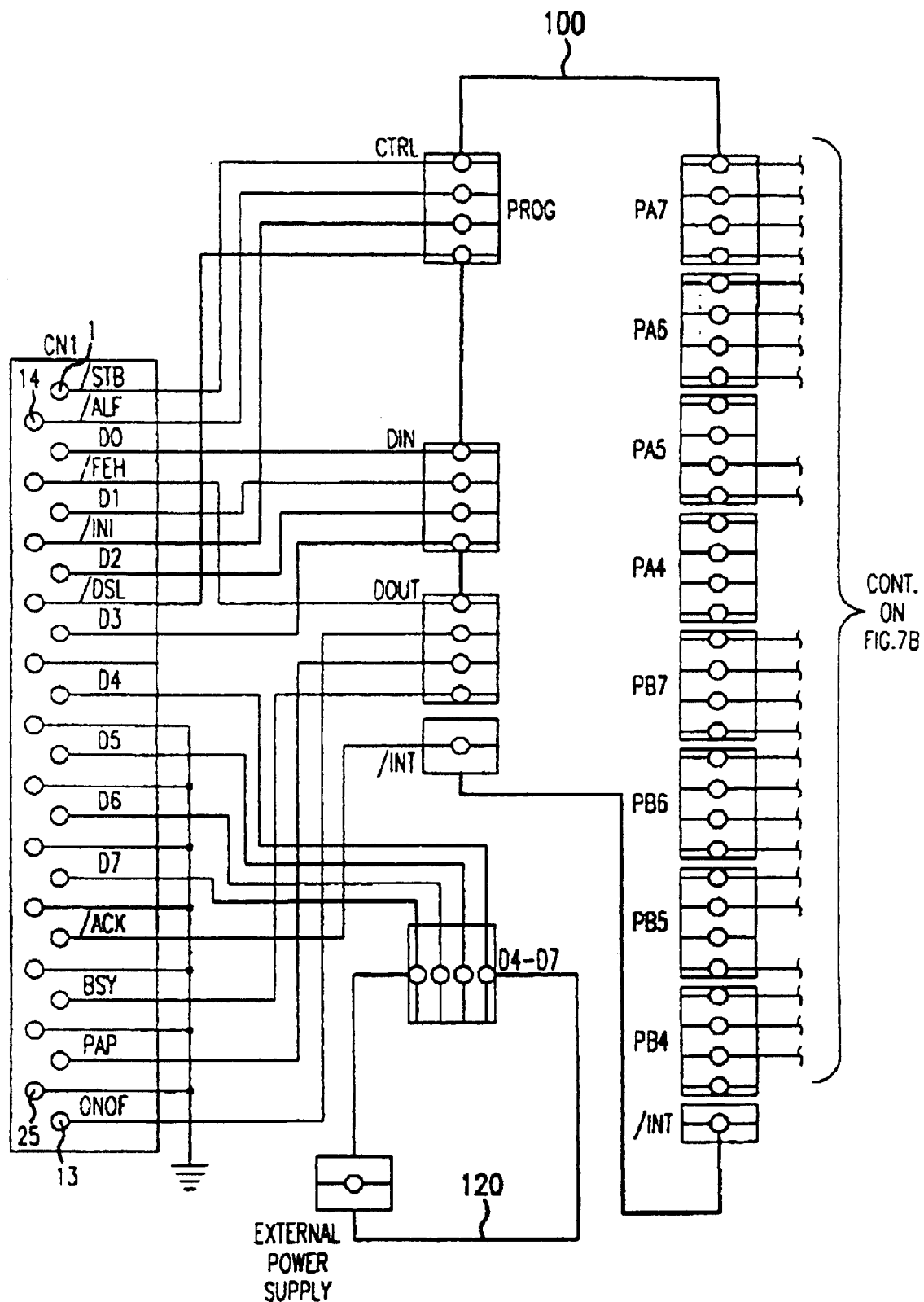
FIG. 7 shows an example of the concrete connection with the I/O expansion device in the case of the SRAM or EEPROM.
Figure 7B:
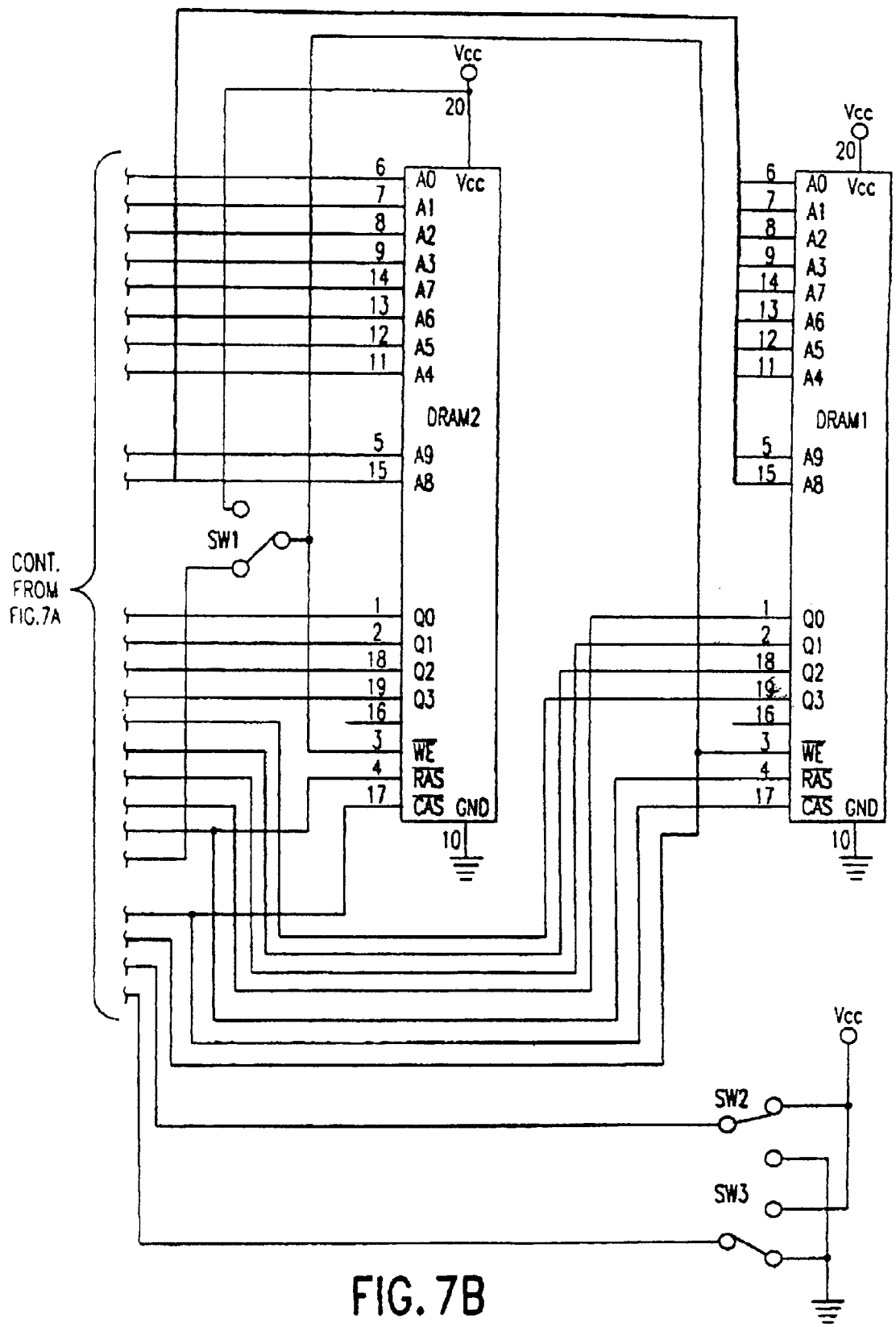
Figure 8:
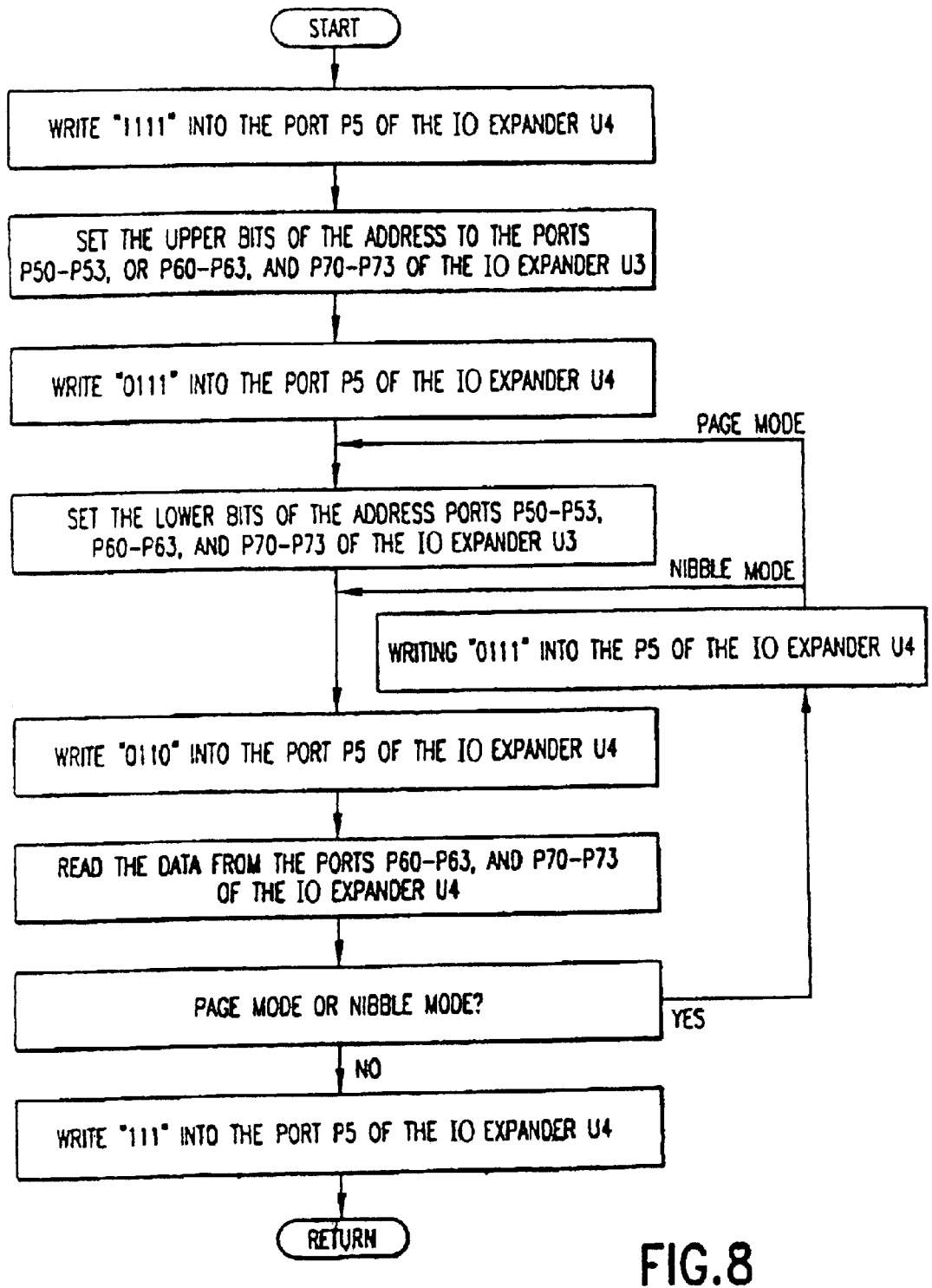
FIG. 8 shows an example in which operation of reading data is carried out byte by byte in the case that the DRAM or the memory with access by the equivalent operation.
Figure 9:
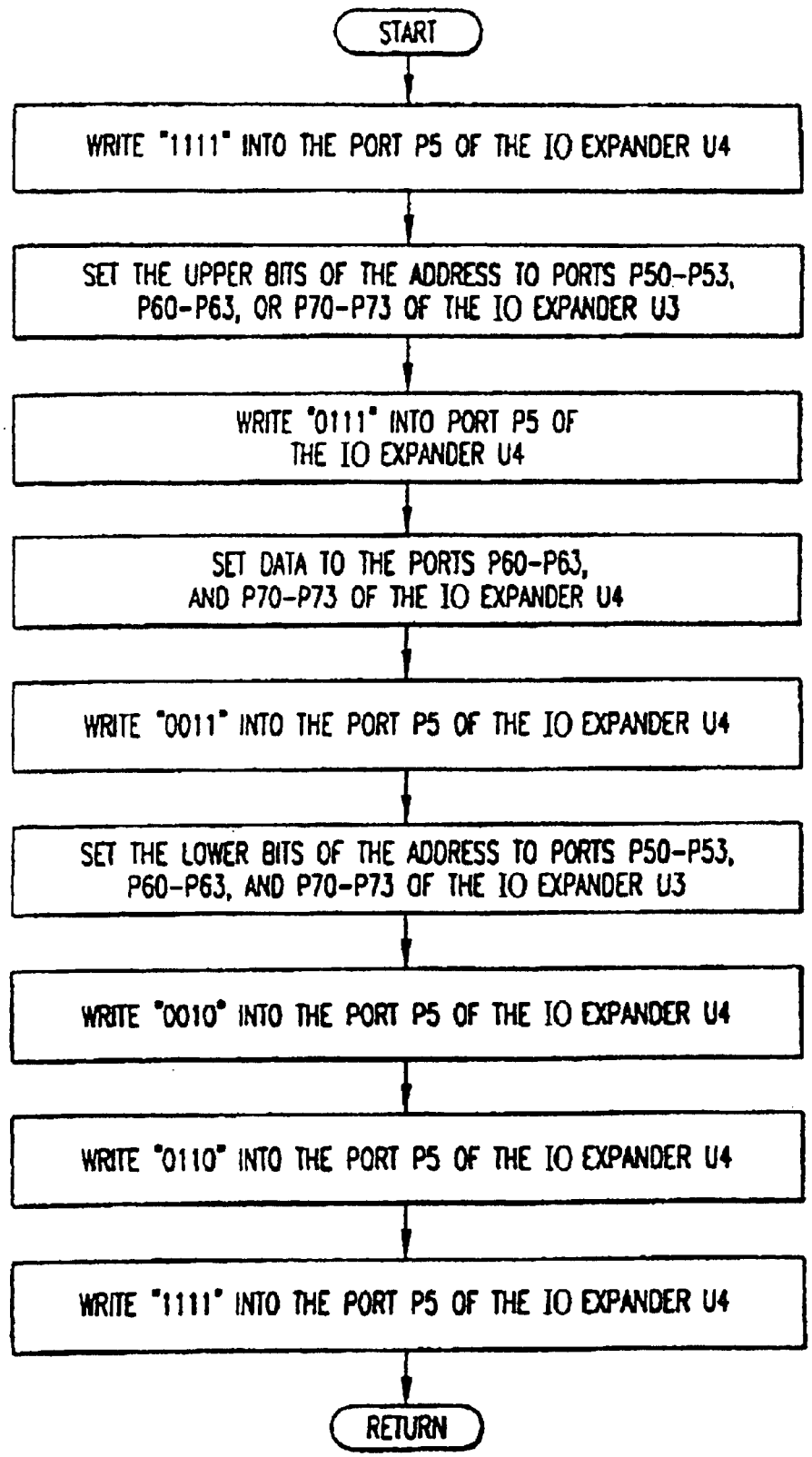
FIG. 9 shows an example in which operation of writing data is carried out byte by byte in the case that the DRAM or the memory with access by the equivalent operation.

FIG. 7 shows an example of the architecture where DRAM or memory with access by the equivalent operation (for example, flash memory etc.) is applied to the memory IC 28, and FIG. 8 and 9 show an example that data is read and written in the circuit shown in FIG. 7.

The read operation is performed to be executed as follows. First; write "1111" into the port P5 of the IO expander U4 connected to the pins /RAS, /WE, and /CAS for controlling the memory. The pins /RAS, /WE, and/CAS of the memory are put in to status "H". Set the upper bits of the address to the ports P50–P53, P60–P63, and P70–P73 of the IO expander U3 connected to the address pins A0–A9 of the memory. Write "0111" into the port P5 of the IO expander U4. The pin /RAS is put into status "L" and the upper bits of the address which has been set is fetched in memory. Next, Set the lower bits of the address ports P50–P53, P60–P63, and P70–P73 of the IO expander U3. Write "0110" into the port P5 of the IO expander U4. The pin /CAS is put into status "L" and the lower bits of the address which has been set is fetched in memory. The data at the address specified by the upper bits and the lower bits is output from the memory. And Read the data from the ports P60–P63 and P70–P73 of the IO expander U4 which are connected to the data pins Q0–Q3 of the memory. Write "1111" into the port P5 of the IO expander U4 to return to the initial status, and the read operation is then completed.

In the operation of reading data successively in page mode or nibble mode, as shown in FIG. 8, after the execution of writing "0111" into the P5 of the IO expander U4 to return the pin /CAS to status "H", repeat the execution of setting the lower bits of the address and the execution of reading data.

The write operation is performed to be executed as follows. First, write "1111" into the port P5 of the IO expander U4. Set the upper bits of the address to ports P50–P53, P60–P63, and P70–P73 of the IO expander U3. Write "0111" into the port P5 of the IO expander U4. Set data to the ports P60–P63 and P70–P73 of the IO expander U4. Write "0011" into the port P5 of the IO expander U4. The pin /WE is put into status "L" and it is put into the write mode. Next, set the lower bits of the address to ports P50–P53, P60–P63, and P70–P73 of the IO expander U3. Write "0010" into the port P5 of the IO expander U4. Write "0110" into the port P5 of the IO expander U4. Thus, the data which has been set is fetched into the memory. Write "1111" into the port P5 of the IO expander U4 to return to the initial status, and the write mode is completed.

As described above, the use of the I/O expansion device materializes a storage device connected to the parallel interface so that the memories come to be connected to the parallel interface and the connected memory comes to be read and written. And it is feasible for the I/O expansion device to operate another interface chip connected instead of memory by controlling the status of respective ports. In the device shown in FIG. 3, port P40 of the IO expander U4 may be used for identifying whether another chip is connected and so on.

It was shown that the data width is eight bits, however, for example, the data bit width may be 4 or 16 bits to remove the DRAM 2 or to add some memory. It is possible that RAM and ROM are also connected together and render in mixed use. In order to identify these cases, a first specified range of the memory is assigned to a header area where required data for identification data such as bit width, rewritability of the memory, total memory size, range of RAM area, range of ROM area, and so on is written, so that it comes to be used for general purposes.

Emulation of the hardware with the I/O expansion device materializes a storage device such as memory and disk unit, SCSI interface, GPIB interface, and so on. When various hardware products such as network adapter like Ethernet, A/D converter, and D/A converter are connected, these are in operation by control of the personal computer successfully. Different types of these hardware products can also be connected with each other, so that the flexible input/output expansion may be performed.

Figure 10A:
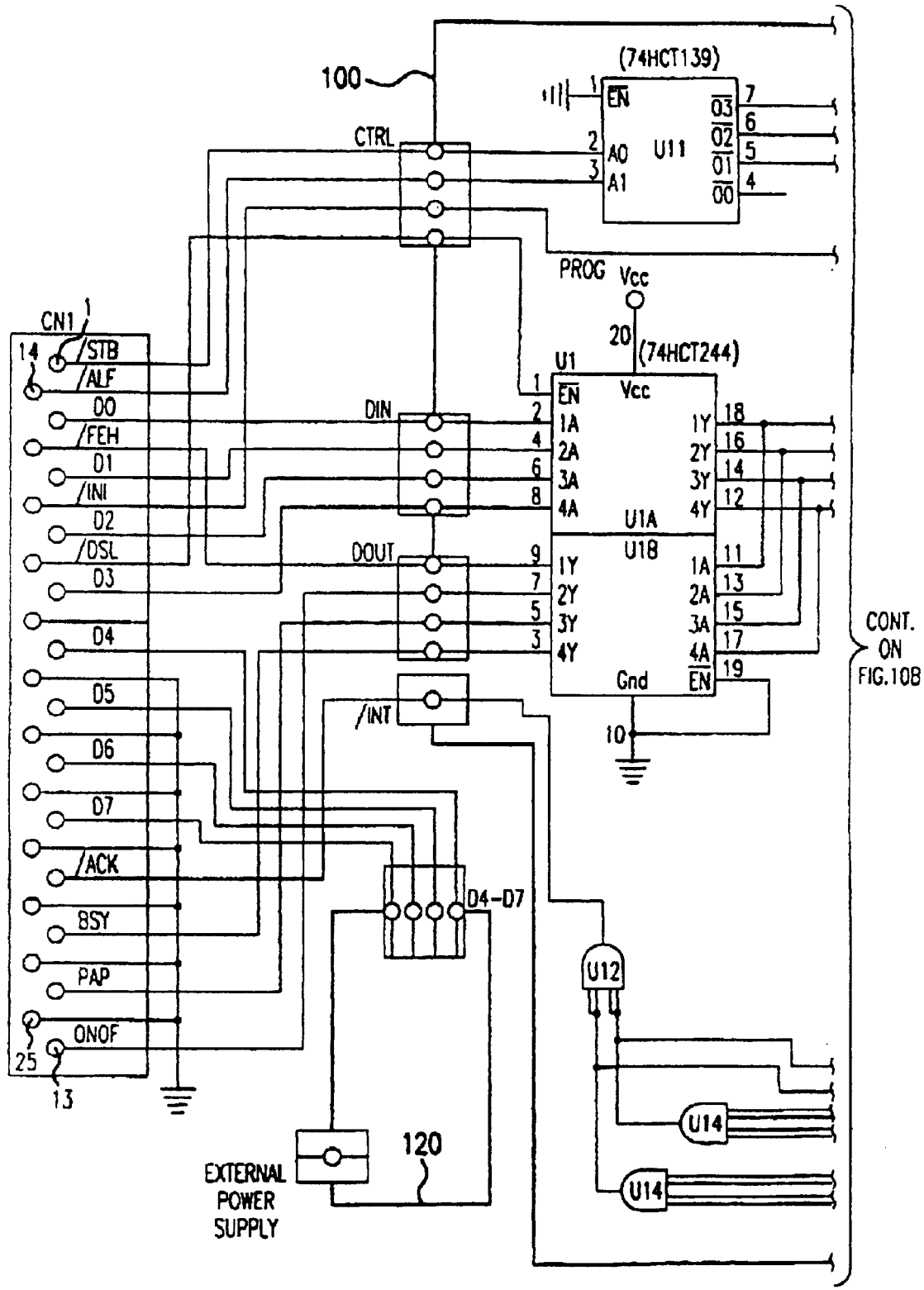
FIG. 10 shows another example of the structure of the I/O expansion device.
Figure 10B:
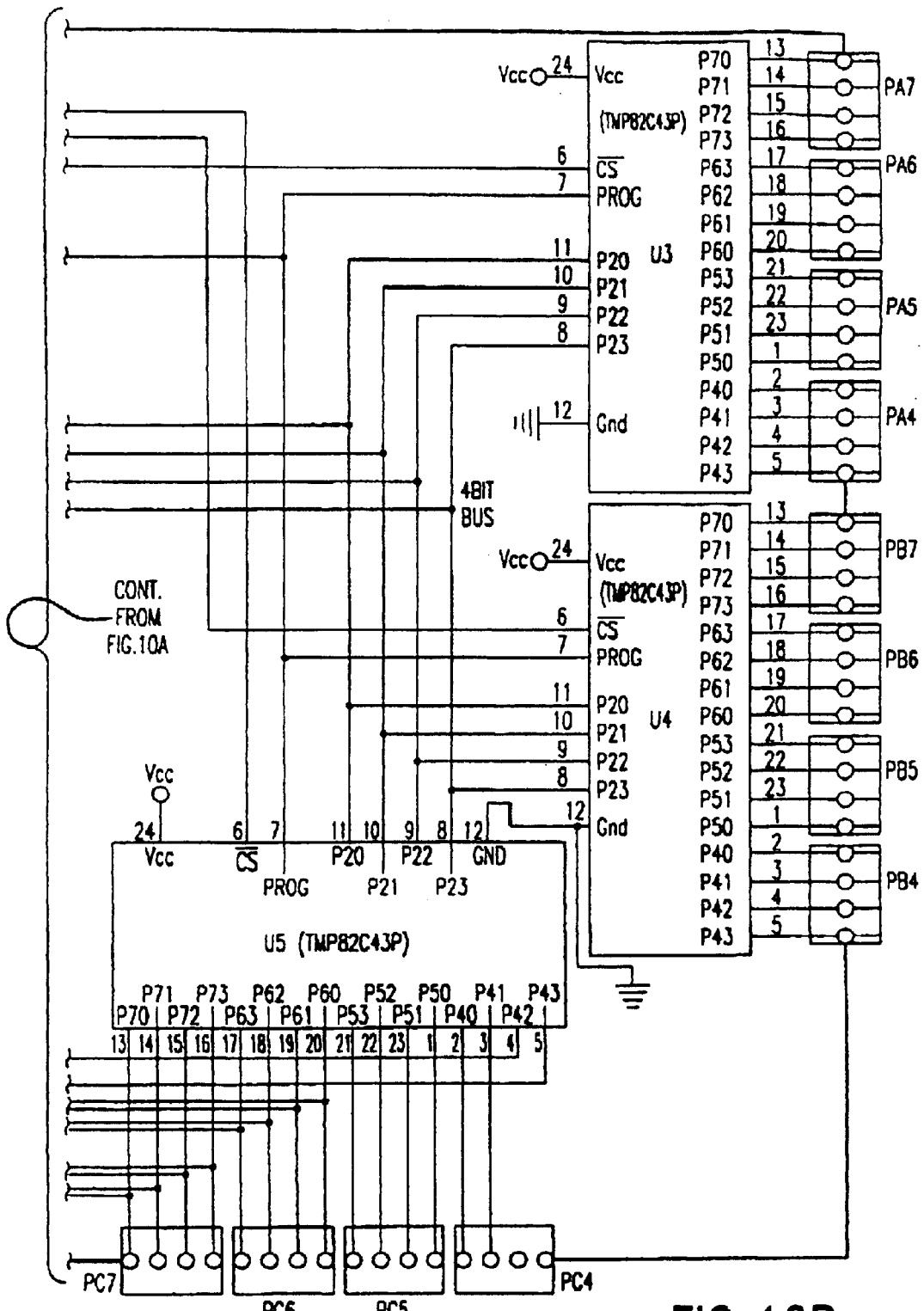

FIG. 10 shows another example of architecture of the I/O expansion device of the present inventions where three IO expanders U3 to U5 are employed, so that an I/O expansion circuit 100 has more data input/output ports PA4–PA7, PB4–PB7, and PC4–PC7.

Pins 1 and 14 of connector CN1 are connected to decoder U11 of which output is connected to pin /CS of IO expanders U3–U5. As shown in Table 6, one of the IO expanders U3–U5 is supposed to be selected according to any status of bits 0 and 1 in the control register.

TABLE 6

| CONTROL bit 1 | REGISTER bit 0 | SELECTED CHIP |
|---|---|---|
| 0 | 1 | U3 |
| 1 | 0 | U4 |
| 1 | 1 | U5 |

Ports PC6 and PC7 are respectively connected to AND-gates U12, U13, and U14 for logical addition with respective ports and for logical addition with all the signals to ports PC6 and PC7. An output of the AND-gate U12 is provided to bit 6 (/ACK) of the status register as an active-low interrupt signal /INT. When ports PC6 and PC7 are used for input, a hardware interrupt is activated in the personal computer by the input from these ports. And, if the interrupt is occurred, which pin the input has been provided to is examined by reading the status of those ports. Processing which responds to the input from ports PC6 or PC7 is executable.

Outputs of AND-gates U13 and U14 are connected to ports PC43 and PC42, and when a hardware interrupt was activated, it is detectable which of ports PC6 and PC7 the input is provided to by means of reading the port PC4 and examining the states of the bits 3 and 4. Particularly when there are many input pins, in this way, processing which responds to the input from ports PC6 or PC7 comes to start more quickly because which one of pins PC60–PC63 or PC70–PC73 the input has provided with more quick inputs is detected.

The other parts are the same as those shown in FIG. 3. Therefore the following operation similar to those shown in FIG. 3 provides access. A transition of strobe PROG from the initial status by controlling of the control register causes the command set in the data register through the data input DIN to be input and the desired port to be put into write or read mode. In the case of the read mode, by means of outputting the status of the selected port to data output DOUT, the status of the selected port from the status register is successfully read. In the case of the write mode, the data provided for the input DIN is successfully output to the selected port.

In FIG. 10, a circuit which should be connected to pins D4–D7 of the output of the data register is abbreviated. Lower power consumption allows use of the same power circuit as that shown in FIG. 3 in this part. And it materializes the expansion of the additional input/output to connect an additional decoder to the output D4–D7 and connect the IO expander to such additional decoder's output and the 4-bit bus.

Figure 11:
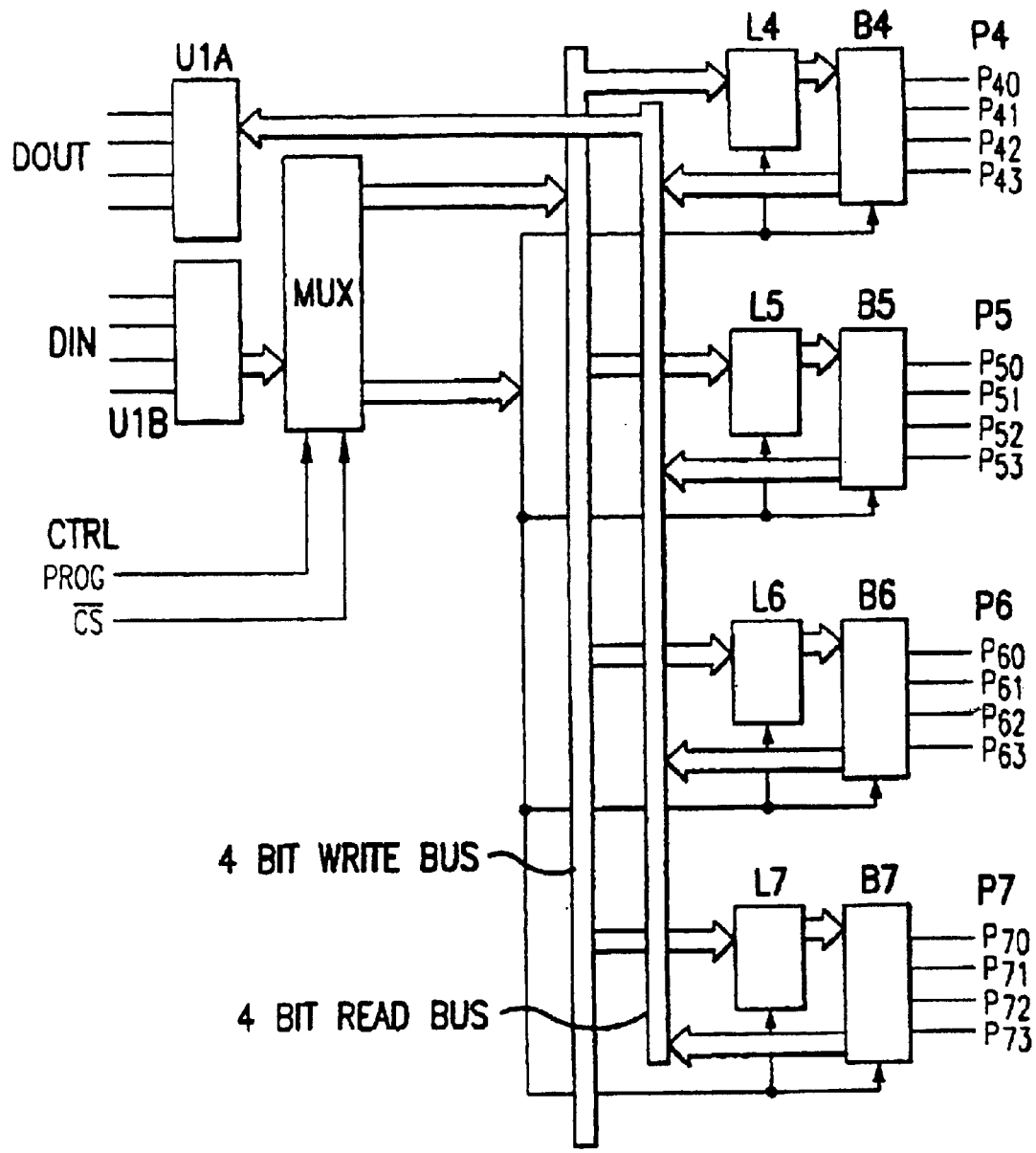
FIG. 11 shows an example of the structure of the I/O expansion circuit.

FIG. 11 shows another example of the structure of an I/O expansion circuit 100. As the circuits shown in FIG. 3 and FIG. 10 have a bidirectional 4-bit bus, the circuit shown in FIG. 11 has a 4-bit write bus (4bit write BUS) for transfering the 4-bit data from the data input DIN to the desired port (P4, P5, P6, P7, . . . ), and a 4-bit read bus( 4 bit read BUS) for transfering 4-bit the data from the selected port (P4, P5, P6, P7 . . . ) to data output DOUT. This circuit is characterized in that two of the unidirection 4-bit data bus is used. This circuit may be made with ordinary logic gates and also be integrated on one chip.

The 4-bit ports of the I/O expansion circuit 100 are connected to D flip-flops L4, L5, L6, L6, L7 . . . and input/output buffers B4, B5, B6, B6, B7 . . . respectively. D flip-flops L4–L7 . . . are for holding the 4-bit data D0–D3 from the data input DIN through the 4-bit write bus (4bit write BUS). The input/output buffers B4–B7. . . constitute a circuit for outputting the 4-bit data held in D flip-flops L4–L7 . . . to respective ports or supplying the 4-bit read bus with external signals provided to respective ports.

In the transition of the signal PROG from status "H" to status "L", control circuit MUX fetches a 4-bit command from the data input DIN and sets the port selected in accordance with the fetched command into write or read mode. And it puts the status of the port selected in accordance with the fetched command to be output to the data output DOUT via the input/output buffer. In the case of the write mode, the data to be written into the selected port is provided to the data input DIN and strobe PROG is returned to status "H", then the write data D0–D3 is fetched in one of the D flip-flop L4–L7 . . . selected in accordance with the command and is output to respective pins of the selected port via input/output buffers B4 , , , B7 . . . In the case of read mode, the status of the selected port is only output to data output DOUT without operation of the write mode as described above.

Commands listed in Tables 2 and 3 are availabe for control circuit MUX, but because ANLD and ORLD modes are not necessarily required, the commands listed in Tables 7 and 8 may be defined to select eight ports is selectable.

TABLE 7

| BIT | | | SELECTED |
|---|---|---|---|
| 2 | 1 | 0 | PORT (PIN No.) |
| 0 | 0 | 0 | PORT4 (P40–43) |
| 0 | 0 | 1 | PORT5 (P50–53) |
| 0 | 1 | 0 | PORT6 (P60–63) |
| 0 | 1 | 1 | PORT7 (P70–73) |
| 1 | 0 | 0 | PORT8 (P40–43) |
| 1 | 0 | 1 | PORT9 (P50–53) |
| 1 | 1 | 0 | PORT10 (P60–63) |
| 1 | 1 | 1 | PORT11 (P70–73) |

TABLE 8

| BIT 3 | MODE |
|---|---|
| 0 | READ |
| 1 | WRITE |

Figure 12:
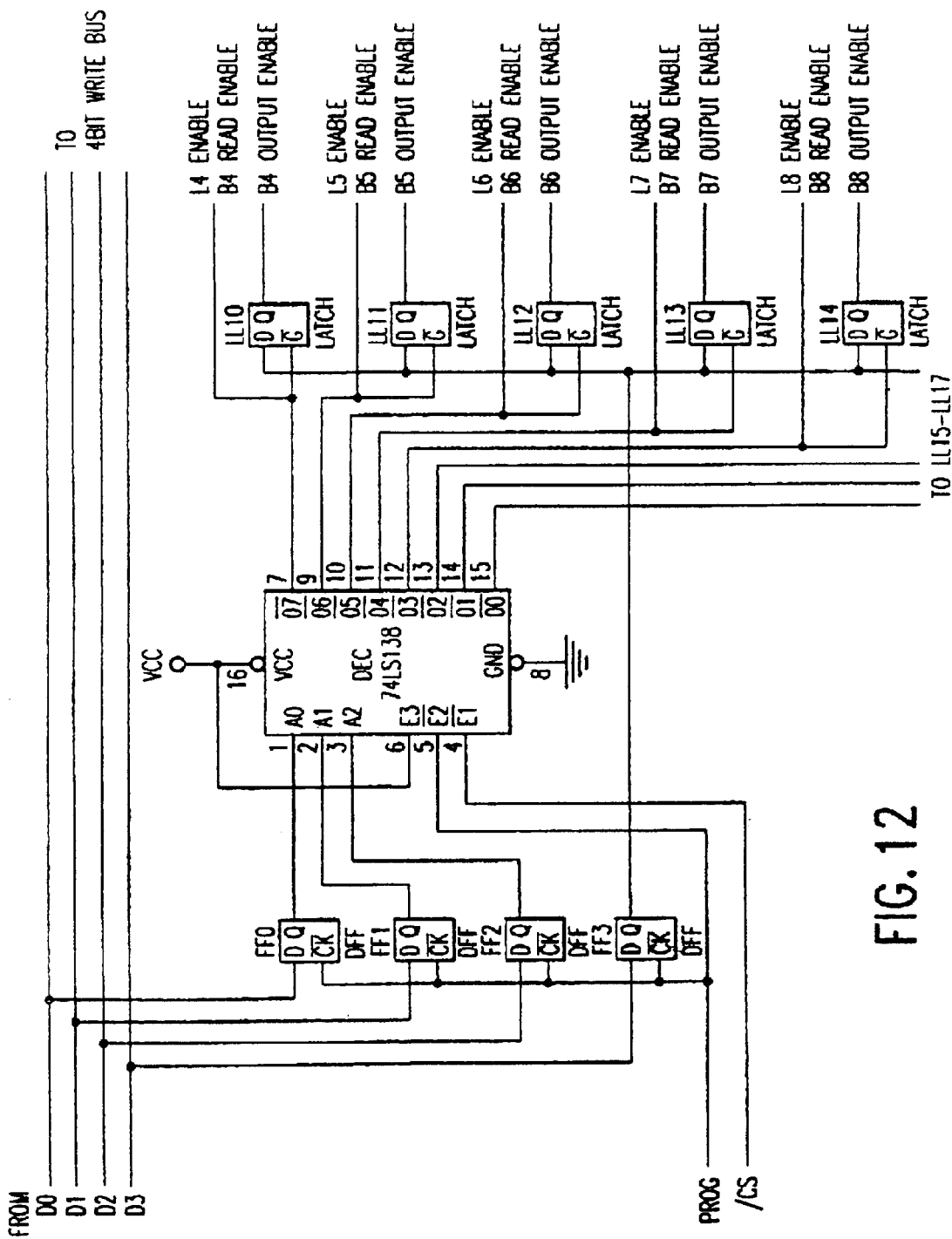
FIG. 12 shows an example of the structure of control circuit MUX.

FIG. 12 shows an example of constitution of control circuit MUX using the commands listed in Tables 7 and 8. This circuit shown in FIG. 12 is composed of standard logic gates as D flip-flop FF0–FF3, decoder DEC, and latches LL10–LL17.

When the signal PROG is changed from status "H" to status "L", D flip-flops FF0–FF3 fetch the 4-bit command from the data input DIN and provide it to decoder DEC. In accordance with lower three bits of the fetched command, the decoder DEC outputs control signals to one of input/output buffers B4–B11 and one of D flip-flop L4–L11 in the corresponding port. Then the decoder DEC makes the status of the port output to data output DOUT from the selected one of the input/output buffers B4–B11. The latches LL10 to LL17 are provided for ports respectively, and are for holding the mode bit which is "read" or "write". D flip-flop FF3 serves for holding a command of "read" or "write", and the status of this register is held in latches LL10 to LL17 corresponding to the selected port when signal PROG returns to status "H". When write mode "write" is held, a corresponding one of the input/output buffers B4–B11 outputs the status of a selected one of the D flip-flops L4–L11 with the command to the port.

In the I/O expansion circuit 100, there is no need to switch the direction of the 4-bit data because the 4-bit buses are unidirectional. Therefore in the present invention the I/O expansion device provided with this circuit provides higher operation speed.

Figure 13A:
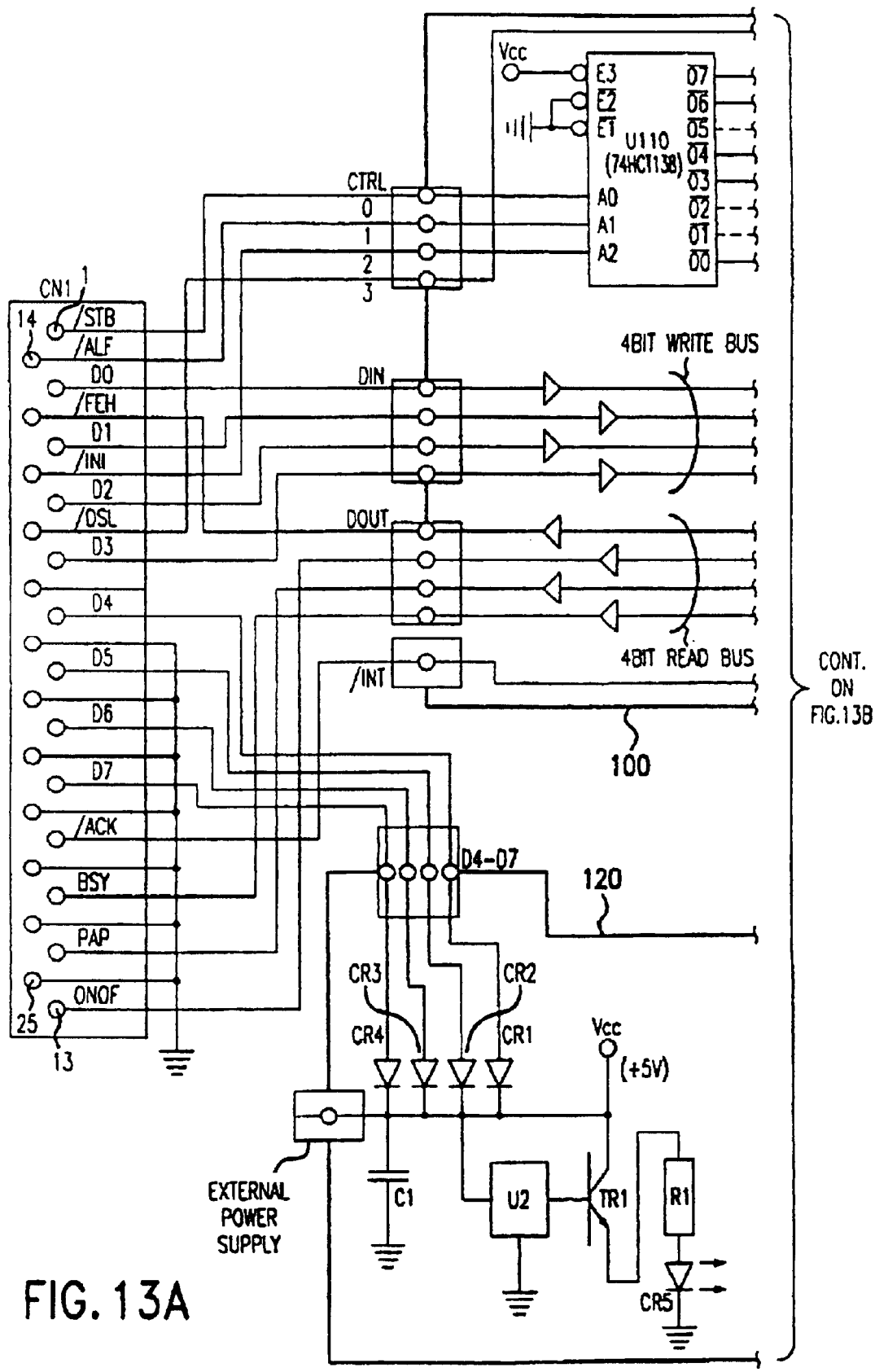
FIG. 13 shows another example of the structure of the I/O expansion device.
Figure 13B:
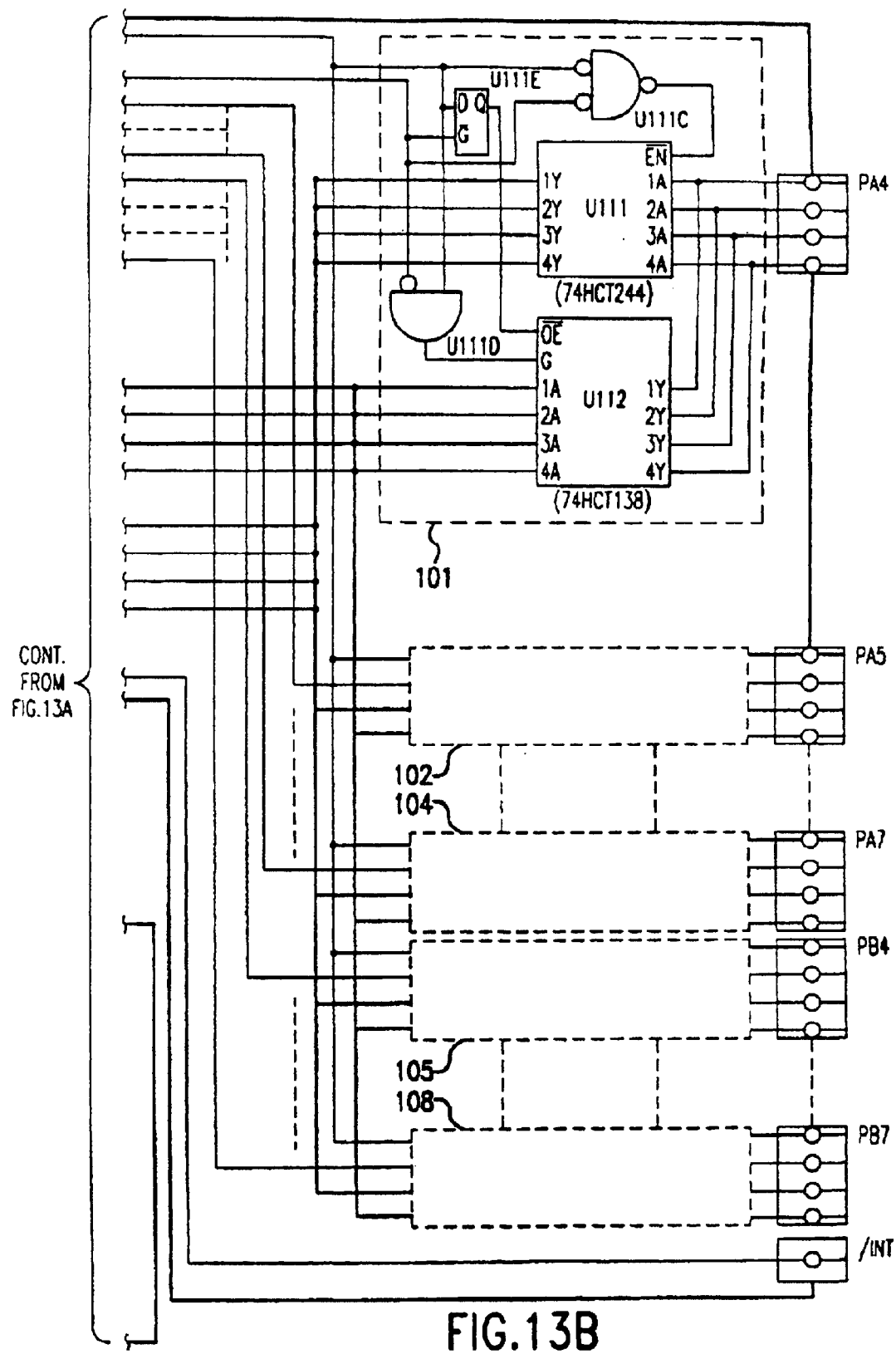

FIG. 13 shows another example of architecture of the I/O expansion device of the present invention. This I/O expansion device is also made with connector CN1 (also including a case where a card edge connector is used for this) and I/O expansion circuit 100, and has power voltage monitor circuit 120 with the same as that shown in the above-mentioned example. In this example shown in FIG. 13, the I/O expansion circuit 100 is constituted with basic logic gates instead of the I/O expander, and it is feasible to integrate on one chip. This I/O expansion unit is constituted as follows.

The I/O expansion circuit 100 has 4-bit write bus and 4-bit read bus, and is characterized in that these two unidirectional 4-bit data buses are used. The 4-bit write bus is provided 4-bit data from the data input DIN via buffer U1A and transfers it to the desired port (PA4, PA5, . . . PA7, PB4, . . . PB7) via one of the input/output circuits 101–108 described later. The 4-bit read bus transfers the 4-bit data from the selected port (PA4, PA5, . . . PA7, PB4, . . . PB7) to data output DOUT via one of input/output circuits 101–108.

Input A0–A2 of decoder 111O are connected to control input CTRL of I/O expansion circuit 100 and assigned to pins 1, 14, and 16 of the connector CN1 (signal lines /STB, /ALF, and /INI from the control register). Decode outputs /00–/07 of the decoder U110 are active-low and are designed to select of one of input/output circuits 101 to 108 described later according to values of bits 0, 1, and 2 in the control register ( bit 2 is inverted and is provided to input A2 of the decoder U110).

The input/output circuits 101–108 are installed for input/output ports PA4 to PA7 and PB4 to PB7 respectively. These input/output circuits 101–108 hold and output data. to be output to ports PA4 to PA7 and PB4 to PB7 or input data from ports PA4 to PA7 and PB4 to PB7 when decode outputs /00–/07 are provided, respectively. The status of bit 3 in the control input CTRL determines whether the 4-bit data to be output to the port is held. When the status of bit 3 of the control input CTRL (pin 17 of the connector CN1, i.e. the signal lines /STB, /ALF, /INI, or /DSL from the control register (bit 3)) is "L" each input/output circuit 101–108 holds the 4-bit data in latch U111A within each of the input/output circuits 101–108 which is selected with decode outputs /00–/07 of decoder U110 (pins 1, 14, and 16 of the connector CN1, i.e. signal lines /STB, /ALF, and /INI from the control register(bit 0,1,2)) and outputs the data. Then the 4-bit data from buffer U111B within one of the input/output circuits 101–108 which is selected with decode outputs /00–/07 of the decoder U110 (pins 1, 14, and 16 of the connector CN1 i.e. signal lines /STB, /ALF, and /INI from the control register (bits 0, 1, and 2)) is output.

Figure 14:
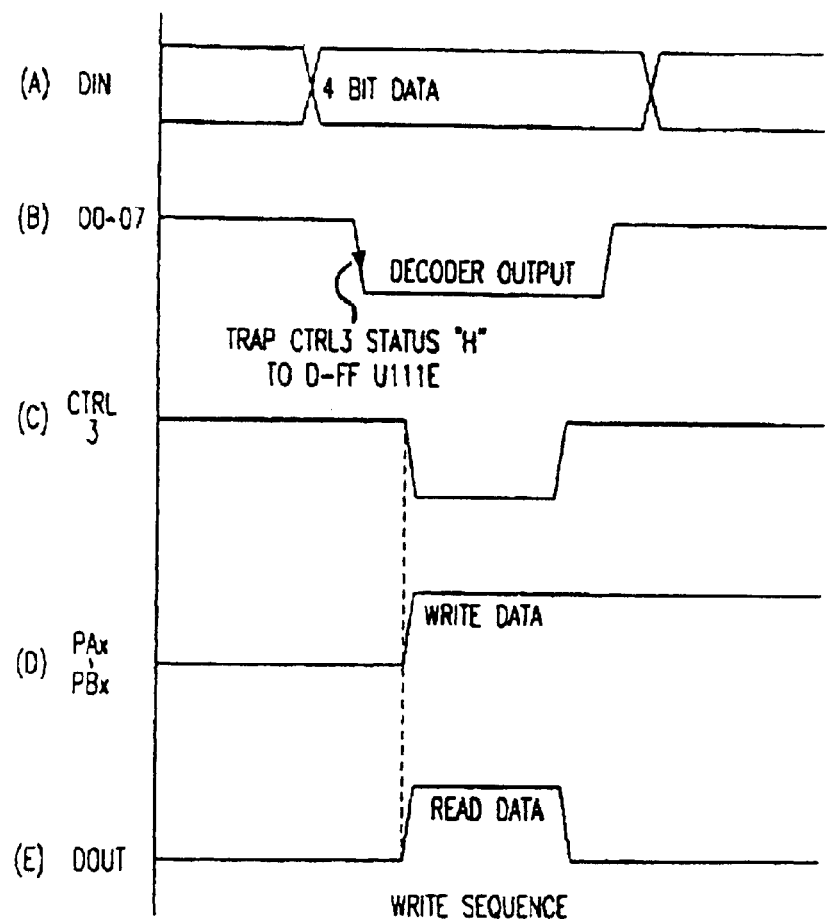
FIG. 14 shows the write sequence of the I/O expansion device shown in FIG. 13.

As shown in the figure, each of the input/output circuits 101–108 is composed of 4-bit buffer U111B for outputting the data provided to input/output ports PA4–PA7 and PB4–PB7 to the 4-bit read bus, and 4-bit latch U111A for holding the data provided to the 4-bit read bus and outputting the data to each of the input/output ports PA4–PA7 and PB4–PB7. And each of the input/output circuits 101–108 is composed of gate U111C for controlling the operation of buffer U111B, gate U111D for controlling the operation of the buffer U111B, and D flip-flop (D-FF) U111E for holding the read/write status of each of the input/output ports PA4–PA7 and PB4–PB7. FIG. 14 shows the operation in the circuit design shown in FIG. 13. Referring this figure, the operation is described as follows.

The operation of writing four-bit data to one of the input/output ports PA4–PA7 and PB4–PB7 is executed as follows. At first, set the 4-bit data to be written to the lower four bits in the data register of the personal computer body to output this 4-bit data from pins 1–4 of connector CN1, then the data is provided for the data input DIN (FIG. 14 (A)). The 4-bit data is output to the 4-bit write bus.

Set 3-bit data (bits 0, 1, and 3 inverted) for selecting one of the ports to the lower three bits of the control register in the personal computer body, then the 3-bit data is output from pins 1, 14, and 16 of connector CN1. Set "0" of write status to the bit 3 of the control register. Then the value of bit 3 is provided for control input CTRL of the I/O expansion circuit 100 in parallel with the 3-bit data (status of bit 3 (CTRL3) of control input CTRL is "H"). One of the decode outputs /00–/07 of the decoder U110 turns to "L" depending on the 3-bit data in bits 0–2 of the control input CTRL (see FIG. 14 (B)). That selects one of the input/output ports PA4–PA7 and PB4–PB7 and activate one of the input/output circuits 101–108.

When one of the decode outputs /00–/07 is set to "L", at its falling edge the value "0" in bit 3 of the control register is set in the D-FF U111E of a selected one of the input/output circuits 101–108. This value indicates the operation of writing data into the selected input/output port, and it is held in the D-FF U111E even if the status of pin 17 of the connector CN1, that is, bit 3 of the control input CTRL is set to "L" (the falling edge of the waveform in FIG. 14 (C)).

According to the status "H" of bit 3 of the control input CTRL and the status "L" of the selected decode output /00 to /07, output of gate U111D of a selected one of the input/output circuits 101–108 is set to status "H". Then latch U111A comes to be enabled to fetch data, and 4-bit data output from the data input DIN to the 4-bit write bus is latched in 4-bit latch U111B. When the holding value "0" is output from the D-FF 111E, the latch 111A come to be enabled to output data and the 4-bit data is output from a selected one of the input/output ports PA4–PA7 and PB4–PB7 (FIG. 14 (D) ).

Thus it is feasible that the 4-bit data output from the data input DIN to the 4-bit write bus is latched in the 4-bit latch 111B and is output from the selected input/output port PA4–PA7 and PB4–PB7). In this way the operation of writing into the desired port is carried out.

Setting "1" to bit 3 of the control input CTRL (the rising edge of the waveform in FIG. 14 (C)) place the output of the gate U111C of the selected one of the input/output circuits 101–108 into status "L" and the 4-bit data provided for the selected input/output port is output to the 4-bit read bus via buffer U111B. And the 4-bit data output to this 4-bit read bus is output to data output DOUT via the buffer U1B (FIG. 14 (E)).

The output 4-bit data is provided for bits 3, 4, 5, and 7 of the status register via pins 11 to 13 and 15 of the connector CN1. By means of reading this with the personal computer body, the 4-bit data output from the input/output port can be stored in the personal computer.

When 4-bit data is output to one of the input/output ports PA4 to PA7 and PB4 to PB7, it is designed not only for data output but also for the confirmation of whether the 4-bit data output to the port is correct. This can be programmed with a computer language such as assembler, C language and the like. With the assembler language, this processing is programmed as follows (variable "write_data" means the write data, and variable "port" means a value of one of input/output ports PA4–PA7 and PB4–PB7, corresponding to one of 0H to 7H where bits 0, 1, and 2 being inverted. Variable "prt_port" means an address of the parallel interface.). An example shown below is programmed in consideration of the application to an 8-bit CPU such as a PC-XT compatible system, and maybe amended by use of register transfer instructions, string transfer instructions and so on so that the operation can run at high speed on a 16-bit or 32-bit CPU.

```
                                    /* prepare ctrl bit3 "H"       */
MOVE    AL, write_data              /* output write data            */
OR      AL, F0H
OUT     prt_port, AL
OUT     (prt_port+2), port          /* one of /00–07 fall down      */
OUT     (prt_port+2), (port+8)      /* ctrl bit3 "H"->"L"           */
                                    /* (if write sequence continue)*/
OUT     (prt_port+2), port          /* ctrl bit3 "L"->"H"           */
/* IF check write data , insert followings after LINE 5             */
IN      AL, (prt_port+1)
MOVE    BL, AL
SHR     BL, 3
AND     BL, 07H
NOT     AL
SHR     AL, 4
AND     AL, 08H
OR      AL, BL
```

Next, read operation is similar to write operation except that "1" remains set to bit 3 in the control register (bits 0, 1, and 3 inverted). The write operation is excuted as follows.

Figure 15:
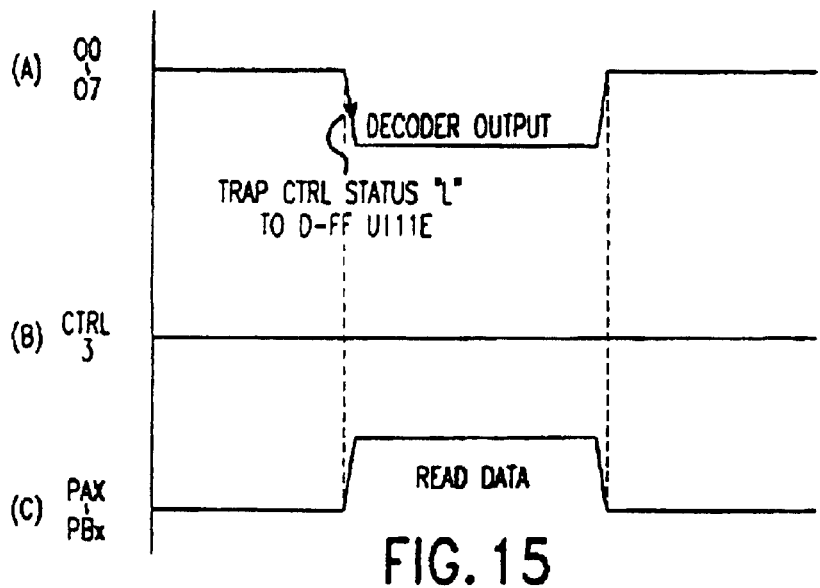
FIG. 15 shows the read sequence of the I/O expansion device shown in FIG. 13.

Set "1" to bit 3 in the control register to put bit 3 in the control input CTRL into "L" (FIG. 15 (B)). And set 3-bit data for selecting an output port to bits 0, 1, and 2 in the control register of the personal computer body to output such 3-bit data from pins 1, 14, and 16 of connector CN1 (FIG. 15 (A)).

This 3-bit data in the control input CTRL puts one of the decode outputs /00 into /07 of decoder U110 into "L", and this transition of bit 3 of the control input CTRL into "L" causes the output of gate U111C to be put into "L". The 4-bit buffer U111B come to be enabled to output data, and a 4-bit data provided for one of the input/output port (PA4 to PA7 and PB4 to PB7) selected by the decoder U110 is output for the 4-bit read bus via buffer U111B. And the 4-bit data output for the 4-bit read bus is output for data output DOUT via the buffer U1B (FIG. 14 (C)).

The output 4-bit data is provided to bits 3, 4, 5, and 7 in the status register via pins 11 to 13 and 15 of the connector CN1. To read this with the personal computer body the 4-bit data output from the input/output port is stored in the personal computer body.

The transition of one of the decode outputs /00 to /07 of the decoder U110 from "H" to "L" causes the value "1" of the bit 3 in the control register to be set to D-FF U111E. This value indicates the operation of reading data from the selected input/output port, and the output of the D-FF U111E is set to "1", so that an output of the latch U111A is put into its high-impedance condition and inhibited.

Thus the 4-bit data from one of the input/output ports PA4–PA7 and PB4–PB7 which is selected with the lower three bits in the control register is successfully stored in the personal computer. The corresponding port is also put into the read mode successfully.

The read operation can be also programmed with a computer language such as the assembler or C language. With the assembler language, the read operation is programmed as follows (the data read from the port is held in the AL register).

```
                                    /* prepare ctrl bit3 "L"        */
OUT     (prt_port+2), (port+8)      /* one of /00–07 fall down      */
                                    /* hold ctrl bit3 "L"           */
IN      AL, (prt_port+1)            /* read 4bit data status port   */
MOVE    BL, AL
SHR     BL, 3
AND     BL, 07H
```

-continued

| | |
|---|---|
| NOT | AL |
| SHR | AL, 4 |
| AND | AL, 08H |
| OR | AL, BL |

In the input-output extension device as shown the example in FIG. 13, the memories are connectable and the operation of reading and writing the connected memory is executable as shown in FIGS. 3 and 7, therefore, a storage device connected to the parallel interface is successfully materialized by the input-output extension device shown in FIG. 13. When the memory is connected as shown in FIGS. 3 and 7, the read and write operations are successfully performed as FIGS. 5, 6, 8, and 9 where ports PA4–PA7 is substituted for ports P40–P43, P50–P53, P60–P63, and P70–P73 of the IO expander U3 and ports PB4–PB7 is substituted for ports P40–P43, P50–P53, P60–P63, and P70–P73 of the IO expander U4.

And it is feasible to connect not only the memory but also other interface chips which are operated by controlling the status of each port. Additionally, it is feasible to connect plural different types of chips. In this I/O expansion device, a specific port may be used for identifying whether a chip other than memory is connected.

Now, the following section explains an example of the personal computer using the storage device in which the memory is connected with one of the I/O expansion devices as shown in FIGS. 3 and 7. FIG. 16 shows an internal constitution of the personal computer.

Reference numeral 300 points out the body of the personal computer that has the similar structure to ordinary PC-XT or PC-AT compatible machines and consists with CPU 310 compatible with 80X86, RAM 320, BIOS ROM 330, keyboard 370, peripherals 350 such as the parallel interface, serial interface and sound interface, video interface 385, and internal bus 301 for connecting these components. There are IC's where the CPU 310, peripherals 350, and video interface 385 are integrated on a single chip such as CHIPS & TECHNOLOGIES's F8680A and the like. There are other chips where the CPU and peripheral device 350 are integrated on a single chip, too.

In the embodiment described in the figure, a monochromatic or color LCD (reference numeral 380) is used as a display unit to reduce power consumption, so that it can be battery-powered easily. Speaker 360 for the output of the sound interface is built in. And connector CN3 used for the output of the parallel interface, connector CN4 used for the output of the serial interface, and connector CN5 (for example, for S-VIDEO) used for the output of the sound and video interfaces are installed.

The storage device 200 has a structure such that memory 180 is connected to any I/O expansion circuit 100 as described above, and is designed to be connected to connector CN3 via connector CN1 to be connected to the parallel interface of personal computer 300. The circuit shown in FIG. 13 is prefered to be used for the I/O expansion circuit 100 so as to operate at high speed.

The personal computer 300 is made so that a program for reading programs or data written into the memory 180 of the storage device 200 is written into the BIOS ROM 330 and the use of program 340 provides access to the memory 180 of the storage device 200 as the Drive. This program is successfully made with the routines shown in FIGS. 5, 6, 8, and 9 (including the application to the circuit shown in FIG. 13). The personal computer 300 is characterized in this respect.

At the start up when the storage device 200 is connected to the personal computer 300, the CPU 310 reads the program or data in the storage device 200 to memory 320 by means of executing the program 340 written into BIOS ROM 330 and executes the program. The CPU 310 stores data in the storage device 200 as the Drives using the program 340.

The personal computer 300, whose body is constituted in above manner, is permitted to be miniaturized and reduced power consumption so as to stand long-time use under battery-operated condition. Therefore a highly portable personal computer is provided.

Equivalent programs for the existing PC-XT or PC-AT compatible personal computer can apply to the program in the memory 180 of the storage device 200. Therefore it is easy to transport such programs written for the PC-XT or PC-AT compatible personal computer to the personal computer 300.

Connectability and accessibility of the storage device 200 with the parallel interface of a desktop-type or notebook-type of personal computers provides the shared use of the programs or data in storage device 200. After the personal computer 300 is used outdoors by connecting with storage device 200, the programs and data in the storage device 200 can be used indoors by connecting the storage device 200 to a desktop-type or notebook-type personal computer.

Figure 18:
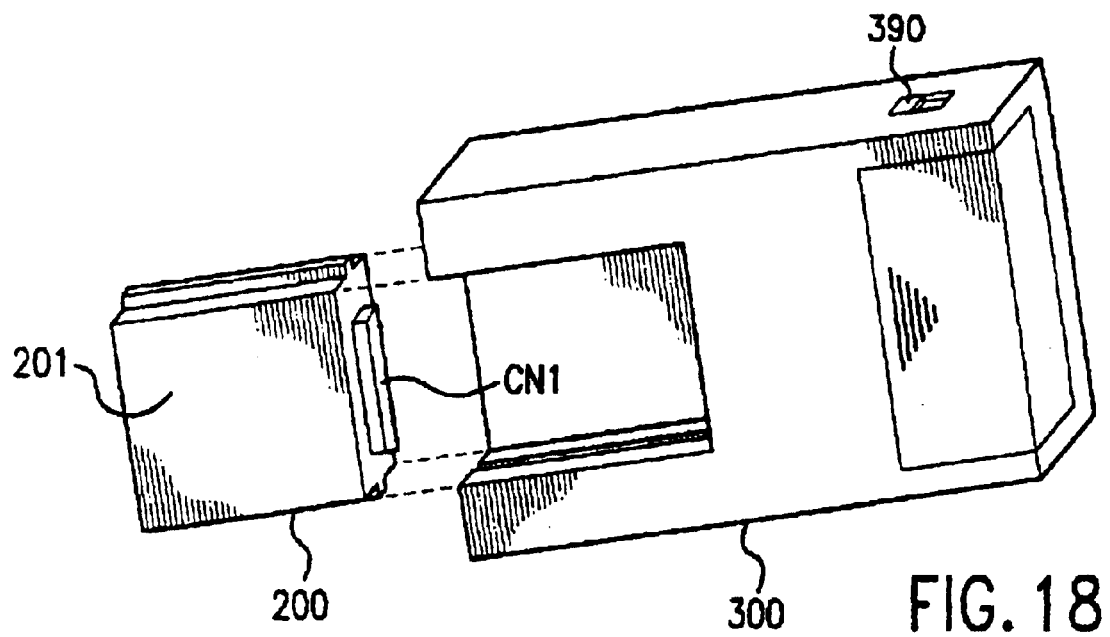
FIG. 18 shows an example of appearance of the personal computers shown in FIG. 16.

It will be appreciated that various types of appearance may be formed since the main body of the personal computer 300 is constituted as described above to be small-sized. FIGS. 17 and 18 show an example of appearance. FIG. 17 shows a view from the side of the LCD 380. FIG. 18 shows a view from the opposite side.

This appearance is characterized in the storage device 200 is provided as a cartridge into the body of personal computer 300.

As shown the figure, the storage device 200 is provided with the I/O expansion circuit 100 and the memory 180 contained in case 201, and connector CN1 outside the case 201 to connect with the parallel interface of the personal computer 300. The storage device 200 is designed to be inserted in personal computer 300 by sliding it with the aid of features such as concave and convex shown in the figure. The connector CN3 of the body of the personal computer 300 is designed to be connected with the connector CN1 when the storage device 200 is inserted into the personal computer 300. The connector CN3 is a female type when the connector CN1 is a male type.

The appearance of the cartridge is not only a containable type inserted in the case 201 but also a thinner type like a card or other than that shown in the figure. The connectors CN1 and CN3 are applied to the mini DSUB connector and card edge connector as to match the size of the storage device 200. The cartridge is not only inserted in the body of the personal computer by sliding it but also installed directly in the personal computer.

As shown in the drawing, inserting the storage device 200 in the personal computer 300 provides direct connection with the connector CN1 and connector CN3 of the body of the personal computer 300. This direct connection reduces affection of noise without use of cables for connecting the storage device 200 with the parallel interface of the body of the personal computer 300, expecting high-speed access to the storage device 200.

The number of keys on keyboard 370 is reduced to minimize the size of the personal computer 300 and for easy operation. For smaller size and more easy-to-use, a software-oriented virtual keyboard using the cursor key is prefered to be substituted for the ten key. In spite of increase of parts, the personal computer 300 may be provided with a track ball or pen-interface input.

The POWER switch 390 is provided on the side of the body of the personal computer 300 so that the battery-operation is possible. Connector CN5 for the output of the sound and video interfaces which is placed on the side of the body of the personal computer 300 allows use of a large size as a display screen if connected to a TV set.

The personal computer 300 is so designed that via the parallel interface the storage device 200 is connected in its body as the IC card. The connector CN1 works for connecting with the parallel interface. The personal computer 300 has high portability and is available for various purposes depending on the programs in the storage device 200. For example, the personal computer come to be used as a portable game computer when a game program is written in the storage device 200. Various additional functions are also provided by mounting various hardware products other than memories in the cartridge.

Thus, using the I/O expansion devices shown in the above examples which is connectable to the personal computer via the parallel interface, a personal computer with good portability and available for various applications is provided.

The above I/O expansion devices are described for the connection with the parallel interface. The 4-bit data is input from or output to a selected input/output port of the I/O expansion device to emulate operations of the data register, control register, and status register. For example, by means of extending registers having functions equivalent to those three registers in the personal computer and connecting the extended register to the above-mentioned I/O expansion device, the equivalent operation is materialized successfully.

Figure 19:
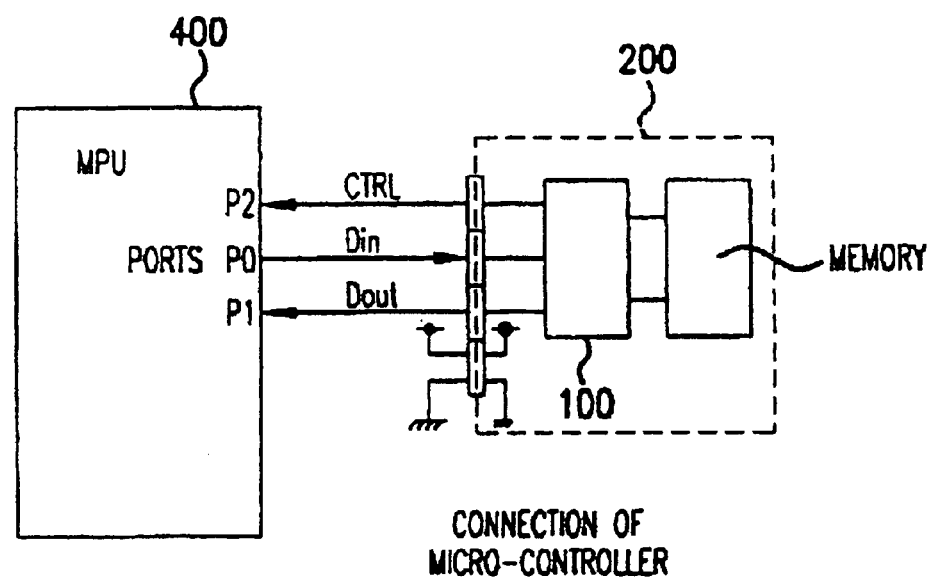
FIG. 19 shows an example of the connection with a microcontroller and the I/O expansion device of the present invention.

The 4-bit data is successfully input from or output to the selected input/output port of the above I/O expansion device by using parallel ports (PIO) of the microcontroller. FIG. 19 shows an example of the connection with them.

Microcontrollers built in various appliances may be used for microcontroller (MPU) 400 which is only required to have the PIO. The figure shows an example that the cartridge 200 is connected to parallel ports P0 and P2. In this example, the data input DIN of the I/O expansion circuit 100 is connected to parallel port P0 of MPU 400, data output DOUT of the I/O expansion circuit 100 is connected to parallel port P1 of the MPU 400, and control input CTRL of the I/O expansion circuit 100 is connected to the parallel port P2 of the MPU 400.

Further, in this example, the power is directly supplied to the cartridge 200 by directly connecting the pin which was connected to output D4–D7 of the data register in FIG. 3 or 13 to the power supply line (+5V).

The 4-bit data comes to be input from and output to the desired port of the I/O expansion circuit 100 by operating parallel ports P0, P1 and P2 so that the output of the parallel ports P0, P1 and P2 are equivalent to the output of the data, status, and control registers respectively.

The 4-bit data is output to a desired port by means of the following algorithm, when the MPU has eight-bit width, bit 0–3 of the parallel ports P0 and P2 are respectively connected to the I/O expansion circuit 100, and a circuit shown in FIG. 13 is used as the I/O expansion 100. The P0, P1, and P2 mean parallel ports P0, P1 and P2 respectively. The others contents are the same as those described above. For example, variable 'port' means one of input/output ports PA4–PA7 and PB4–PB7 of the I/O expansion circuit 100 as described above.

| | |
|---|---|
| MOVE | AL, write_data |
| OUT | P0, AL |
| OUT | P2, (port+8) |
| OUT | P2, port |
| OUT | P2, (port+8) |
| /* IF check write data , add followings line */ | |
| IN | AL, P1 |

The operation of inputting the 4-bit data is carried out by means of the following algorithm.

| | |
|---|---|
| OUT | P2, port |
| IN | AL, P1 |

In this way, that data is stored in the memory and the stored data is read is successfully carried out by emulating the operations of reading and writing memory by means of inputting and outputting the 4-bit data from and to the desired port of the I/O expansion circuit 100. In the case that the circuit shown in FIG. 3 is used, the 4-bit data is input from and output to the desired port of the I/O expansion circuit 100 equivalently.

As described above, according to the above-mentioned I/O expansion devices, it is easy to input and output 4-bit data with a microcontroller having parallel ports. Because of its easy connection with the MPU, the storage devices using the above-mentioned I/O expansion devices are also available as the external storage of various appliances (ex. a facsimile, a modem, a telephone set, a copy machine, a printer, a video tape recorder and so on). Further, such devices also realize the exchange of data among these appliances and personal computers.

To apply that the above I/O expansion device is easily connected to a one-chip microcontroller having parallel ports as described above, an extension unit for connecting the above storage device to a personal computer is easily constituted.

Figure 20:
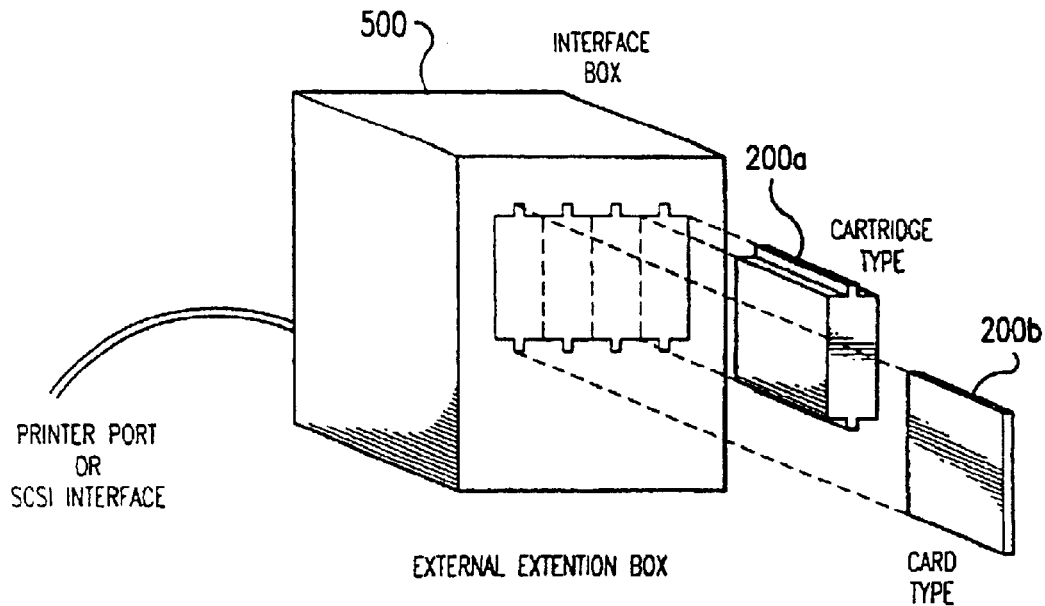
FIG. 20 shows an example of the appearance design of the extension unit for connecting the storage device using the I/O expansion device of the present invention to the personal computer.

FIG. 20 shows an example of the appearance design of the extension unit. Extension unit 500 can be connected to SCSI interface or printer interface of a personal computer via cable. This expansion unit can be connected up to four cartridges 200. The cartridges are classified into a thick type (reference numeral 200a) and thin type (reference numeral 200b) depending on required mechanical shapes.

Figure 21:
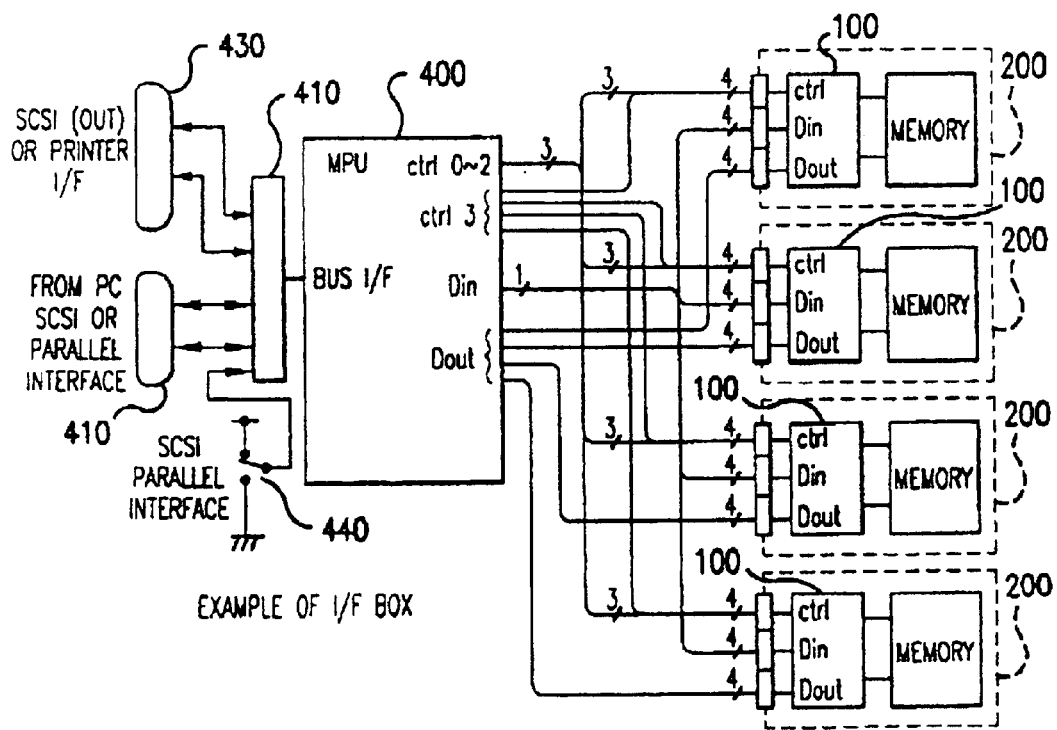
FIG. 21 shows a block diagram of the inside of the expansion unit of the present invention.

FIG. 21 shows a block diagram of the inside of the example. Because of the limited number of PIO outputs, the microcontroller (MPU) 400 is connected to chip 410 for parallel interface (for example, 8255A, 6823, or 82C11 and the like including the chip for printer interface) via its bus interface (bus I/F), so that the number of the PIO outputs is increased. The chip 410 for parallel interface is also connected to connector 410 for the connection with the printer or SCSI interface of the personal computer. The chip 410 for parallel interface is further connected to connector 420 for daisy chain connection. A program for the operation of this chip 410 for the parallel interface to work as the printer interface or the SCSI interface is written in the ROM (not shown) connected to MPU400. The chip 410 for parallel interface is connected to switch 440 for selecting means for connecting with the personal computer from the printer interface and the SCSI interface.

The PTO of the MPU 400 are connected to the cartridges 200. This unit is characterized in that four cartridges are connectable. Pins ctrl0, ctrl1, and ctrl2 of the cartridge 200 are commonly connected, but pins ctrl3 are separately connected to the PIO of the MPU400. Pins Din of the cartridges 200 are commonly connected, but pins Dout are separately connected to the PIO of the MPU400. In this example, the pins of each cartridge 200 which were connected to outputs D4–D7 of the data register are directly connected to the power unit (+5V) equivalently to the example shown above, so that the power is directly supplied to the cartridge 200.

This connection mode reduces the number of the PIO outputs. And, 4-bit data is output by following algorithm in the case that assume that pins ctrl–ctrl2 of the cartridges 200 are connected to the lower four bits of parallel port P2, pins ctrl3 of respective cartridges 200 are connected to the upper four bits of parallel port P2, pins Dout of respective cartridge 200 are connected to parallel port PIX (X is a value of port to each cartridge), and the circuit shown in FIG. 13 is used:

```
MOVE    AL, write_data
OUT     P0, AL
OUT     P2, (port+x) /* x=08h, 0fh, 10h, or 20h */
OUT     P2, port
OUT     P2, (port+x)
/* IF check write data , add followings line */
IN      AL, P1X
```

The operation of inputting the 4-bit data is carried out by means of following algorithm.

```
OUT     P2, port
IN      AL, P1X
```

Even if the number of the cartridges 200 is increased, as described in this example, the data is successfully stored in a memory and the stored data is successfully read by emulating the operations of reading and writing the memory by means of inputting and outputting the 4-bit data from and to the desired port of the I/O expansion circuit 100 equivalently to the example shown in FIG. 19.

The operation of reading and writing the memory are written in the ROM (not shown in FIG. 19) connected to the MPU 400, and MPU 400 can access memory 180 of the storage device 200 as a Drive by reading the program or data written in the memory of the storage device 200 and using it.

Various devices (for example, 8-bit, 16-bit, 8086 compatible, 68K compatible devices and so on) are permitted to apply to the MPU 400, and especially the use of a device compatible with the 8086 (for example, 80186, 80188, V25, V50, Am186EM, Am386EM, and so on) provides compatibility with PC/AT compatible machines in software. In the case that SCSI interface is used for the connection with personal computers, it is easy to transport the SCSI driver software developed for the PC/AT compatible machines. In the case that a printer interface is used for connection with the personal computer, it is easy to transport commands as in DOS, for example "intersvr". It is easy to operate as a drive by means of these software products developed for the PC/AT compatible machines. Therefore, the above ROM where these software products is written brings easy construction of the extension unit.

Further, the I/O expansion device that is easy to be connected with the MPU provides constructions of very simple appliances using the one-chip microcontroller.

Figure 22:
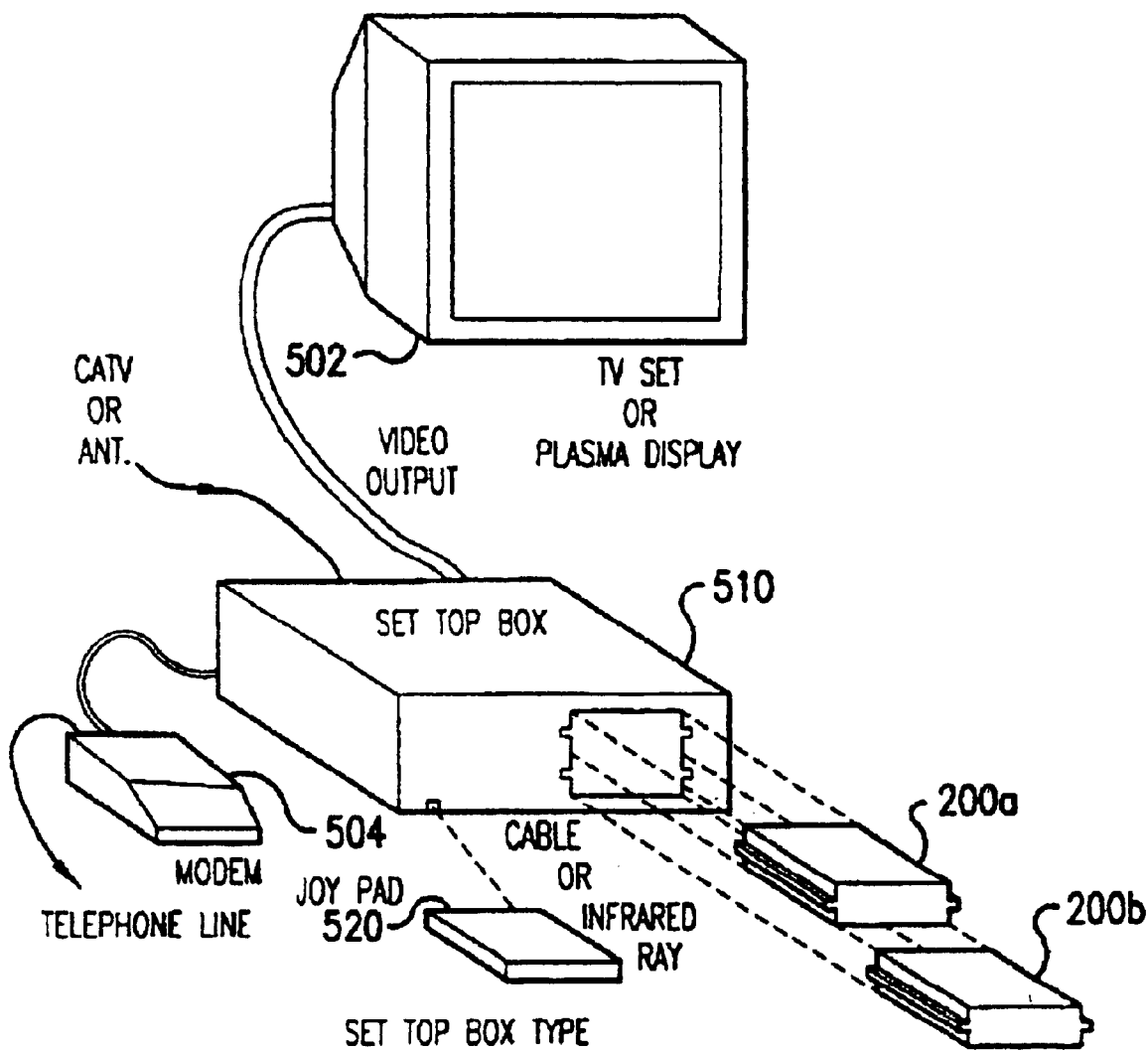
FIG. 22 shows an application example of the construction of a set top box using the I/O expansion of the present invention.
Figure 23:
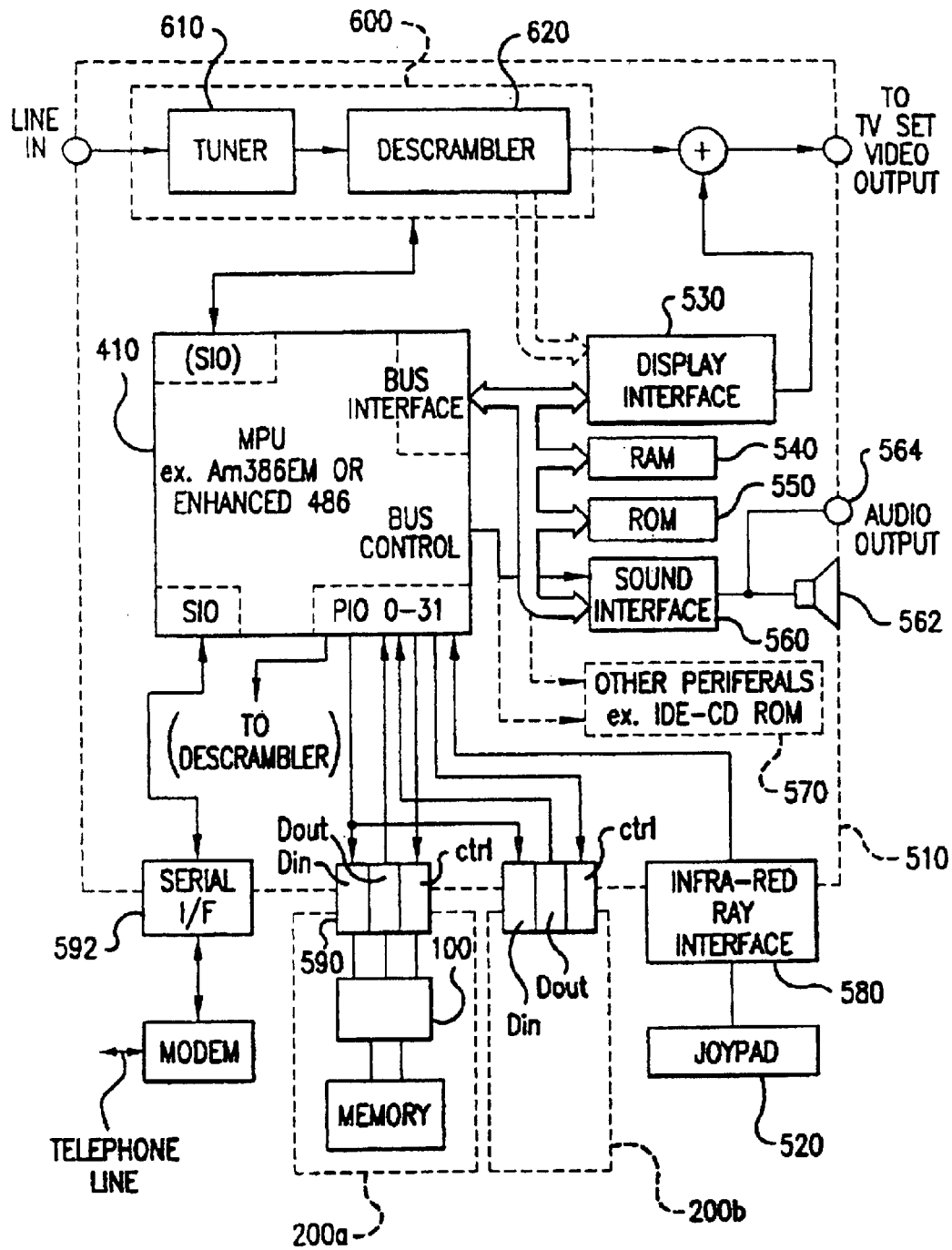
FIG. 23 shows an example of the internal block diagram of a set top box using the I/O expansion of the present invention.

FIG. 22 or 23 shows an application example of a communication device which is designed as a set top box having a CATV converter.

FIG. 22 shows an appearance design of the set top box, and this set top box 510 inputs a signal from a TV antenna or CATV cable and outputs a video signal to the TV set 502. And Modem 504 is connectable, therefore, the communication using a telephone line (including wireless communications such as cellular phone, PHS, and so on) is provided. A joy pad (Joy pad) 520 having fewer keys than an ordinary full keyboard is used as input device, and the input from the joy pad 520 is transmitted to the set top box 510 by infra-red ray or cable. Further cartridge 200a or 200b is connectable.

FIG. 23 shows an example of the internal design of the set top box 510.

The set top box 510 incorporates receiver 600 for TV or CATV. The receiver 600 is equivalent to a receiver used for ordinary TV or CATV. The receiver 600 has a TV tuner 610 for receiving and demodulating TV or CATV signals and descrambler 620 for descrambling the scrambled video signal from TV tuner 610, and outputs video signals from the TV or CATV signals. When the input signal is corresponds to digital TV, the receiver 600 is suitable for it.

Various devices are applicable to apply to the MPU 410, but prefered CPU is what has 80386 or higher for the CPU core is prefered, considering of 32-bit operation support and compatiblity with MS-Windows a widely-used operating system at present. Also taking multimedia use into consideration, the clock frequency is prefered to be as high as possible. For example, AMD's Am386EM, Am486SE, Am486SELV, etc are cited as such CPUs, taking account of cost. These CP3Us are able to operate at 40 or 33 MHz clock frequency. For another example, such a chip as the PowerPC is cited in future.

The MPU of AMD's Am386EM has thirty-two pins of PIO and two ports of SIO as well as the bus interface, DRAM interface, DMA and the timer, and it is designed to connect the MPU to peripheral chips.

The bus interface of the MPU is connected to DRAM 540, ROM 550, display interface 530, and sound interface 560. It can be connected to the other peripherals such as a CD-ROM drive having the IDE interface, if necessary. These peripherals are the equivalents that are used for ordinary personal computers ( However, the chip described later seems to be prefered to be used for the display interface 530 described later).

Outputs of the display interface 530 and video signal from receiver 600 are alternately selected or added and output from the video output. A situation that the video signals output from descrambler 620 are digital signals permits writing the digital video signals directly to the video memory of the display interface 530. To increase the drawing speed, display interface 530 is prefered to perform two-dimentional or three-dimensional image processing. Considering that it is used for multimedia, it seems that prefered video chips used for the display interface 530 are chips used for so-called home game machines such as 3D0, SEGA's SATURN, SONY's PLAY-STATION and so on.

The PIO of the MPU are prepared in connection with the cartridges 200a and 200b as described above. The number of PIO pins is reduced by the common connection with pins ctrl1 to ctrl2 and pin Din of the cartridge 200, and this is the same as the example as described above. The PIO of the MPU is connected to interface 580 of joy pad 520 to input data from joy pad 520. The interface 580 of joy pad 520 may be connected to the MPU bus interface.

One of the SIO within the MPU or the rest of the PIO are connected to receiver 600, which provides selection of the channel and control of the unscramble. The other of the SIO of the MPU is ready to connect with the modem and the like, which provides communication by telephone line and the like. Communication services as karaoke is able to be brought.

As the example described above, a program for reading or writing the storage device 200 is written in ROM 550, which brings access to the memory of the storage device 200 as the Drive. As an operating system that can be written in the ROM and is compatible with MS-Windows, for example, "Modular Windows" is well-known, which is developed by Microsoft Corporation (cf. Nikkei Electronics p99, 1st. Feb. 1993). This operating system can support additional driver softwares such as a driver for accessing a memory of the storage device 200, a driver for receiver control, and a driver for a display interface matching a video chip (including image processing). The operating system with these additional drivers which is written into the ROM 550 improves a set top box shown in the figure with an easy-to-use graphic interface and favorable multimedia use.

Though there are different types of video chips, the driver for the display interface performs an operation based on a common API (Application Program Interface). The API installed in an operating system of the personal computer extends use of software products for the set top box shown in the figure to personal computers.

The storage device 200 can hold user ID, information and softwares for controlling the unscramble, and so on. The unscramble control is carried out by means of selection of the channel and a driver for controlling the unscramble.

Thus the set top box is available for the management of TV and CATV viewers besides multimedia uses. Combination of these uses is allowed. So processing informations sent from TV or CATV is also allowed.

For example, telemarketing through CATV is prospering recently. The use of the set top box improve the exchange of information such as supply of price information and proposal of purchase via modem while watching TV.

Domestic TV broadcast in Japan have transmission of video and character signals at the same time, named teletext. It is feasible for various digital signals sent for the teletext to transfer to the PIO and SIO of the MPU 410. And various process of these digital signals with the MPU 410 of the set top box can be carried out. In this way, TV and CATV are put in multiple use. The storage device 200 also stored with programs for such processings makes the stored programs exchangeable, thereby spreading an applied range of the set top box very widely.

Figure 24:
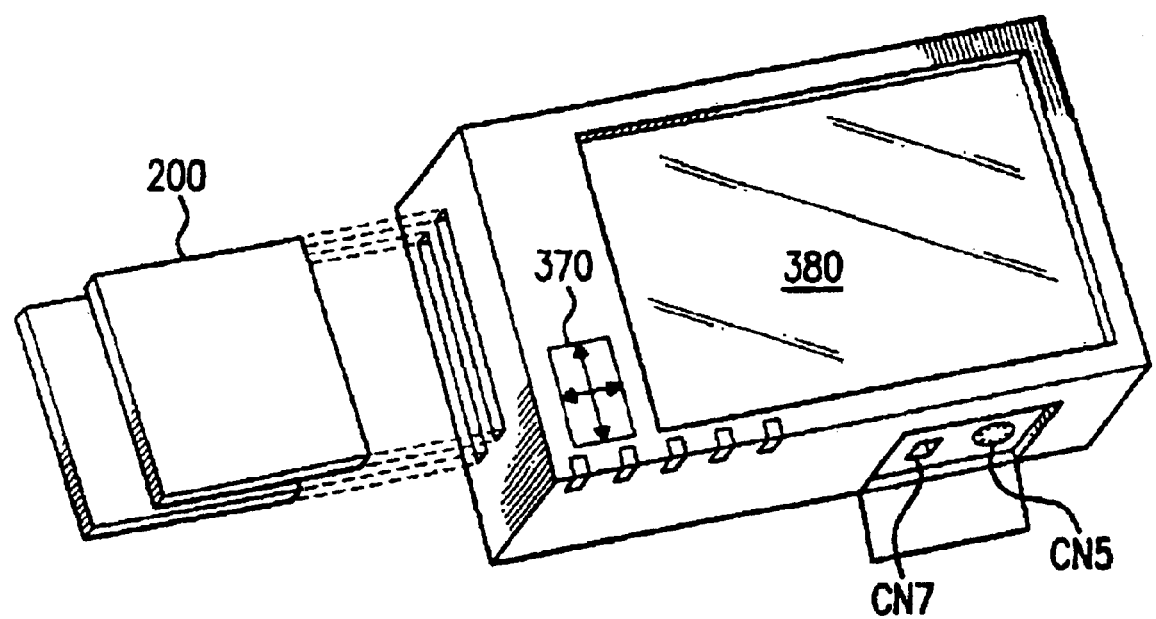
FIG. 24 shows the appearance design of a portable information terminal made with the storage device using the I/O expansion circuit of the present invention.

A portable information terminal is well-known as a device using "Modular Windows" (Nikkei Electronics 1p99, 1st, Feb. 1993). FIG. 24 shows its appearance design as to insert storage device 200 shown in each of the above-mentioned embodiments into its body.

In this design, a color display (CGA, VGA, or SVGA) is preferred for LCD display 380 rather than a monochrome one. A keyboard including cursor key 370 may be used as the input device, but reduction of the number of the keys is prefered. If need be, the keyboard is connected by connector or pen entry. And there is connector CN5 for sound and video outputs for displays. The communication with telephone line via connector CN7 is possible.

Figure 25:
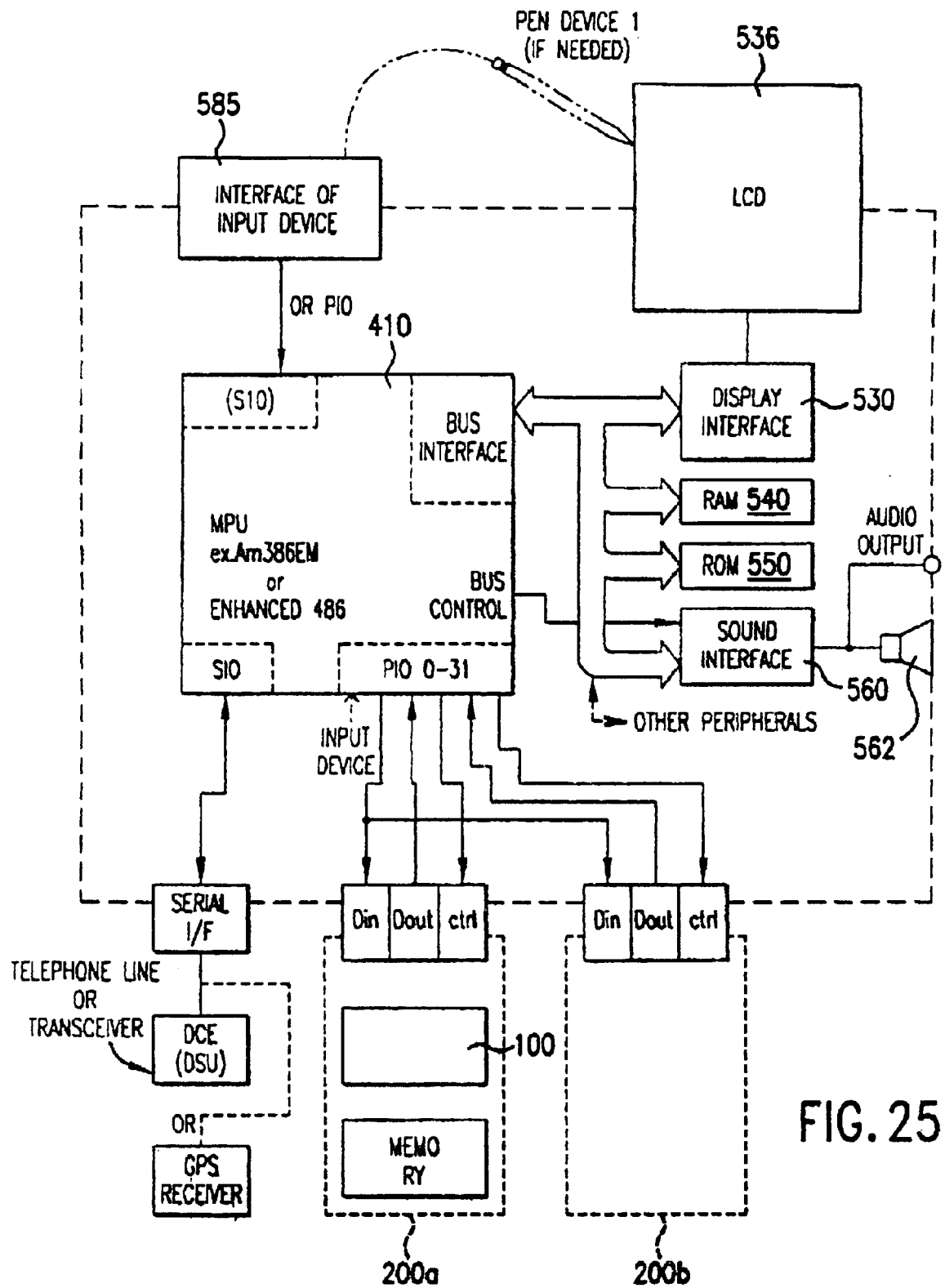
FIG. 25 shows the block diagram of the internal design of the portable information terminal made with the storage device using the I/O expansion circuit of the present invention.

FIG. 25 shows a block diagram of the internal design of the portable information terminals shown in FIG. 24. The information terminals are allowed to be used for the moves such as automobiles. The MPU 410 may be the same as that shown in FIGS. 22 and 23. In this example, the AMD Am386EM is used for the MPU 410.

The bus interface of the MPU is connected to the DRAM 540, ROM 550, display interface 530, and sound interface 560. These units are the same as those used in ordinary personal computers (A special interface is not required for the display interface 530 because the LCD is used for display.). As required, the other peripheral devices, for example, SCSI and IDE interfaces are allowed to be connected. Connecting such interfaces brings connection with CDROMs for example.

The PIO of the MPU is prepared to be connected to cartridges 200*a* and 200*b* described above. The number of PIO outputs is reduced by connecting pins Din and ctrl to crtl2 of the cartridge 200 commonly, and this is the same as the example described above. The ROM 550 stores the operating system, Modular Windows, and the additional drivers such as a driver for accessing the memory of the storage device 200 as a drive, a driver for communication control described later, and a driver for a display interface suitable for video chips.

One of the SIO of the MPU (or the rest pins of PIO are) is so connected to an input device as to supply the input to it. The other SIO of the MPU is ready to be connected to DCE (data circuit terminating equipment). The DCE, assumed to be a modem generally, is prefered to be provided with the digital signal without converting it into an analog signal, since internal digital signal processings in mobile radio communications such as cellular phone, PHS, and transceivers are carried out. The communication is provided via extensions connected to the PIO or bus interface rather than the communication by telephone line via provided the SIO, taking the transmission speed into account.

Having such a design provides down-sizing and low power consumption to stand for a long-time even under battery-powered condition. Therefore, the present inventions provide a highly portable and easy-to-use information terminal.

It is possible for the program written into the storage device 200 to have compatiblity with existing MS-Windows, so that it is easy to transport a program written for the existing MS-Windows in the portable information terminal.

Sharing program or data in the storage device 200 with desktop-type or notebook-type personal computers is allowed. Therefore, it is possible both to use this portable information terminal outdoors (in automobile) and to use the program or data in the storage device 200 indoors by connecting the storage device 200 to a desktop-type or notebook-type personal computer. Thus the program or data is available in equal circumstance irrespective of the outdoors and indoors.

Running so-called navigation software with a GPS receiver connected to the SIO of the MPU displays routes or current positions on a map. In this case, storing the navigation software and map data in the storage device 200 presents easy operations for users. I think that response of the display on the map will be improved by adoption of a chip developed for a car navigation system or chip used for home game machines such as 3DO, SEGA's SATURN, SONY's PLAY-STATION and so on as a chip used for the video display interfaces when the storage device 200 is used as an information terminal for movers.

Figure 26:
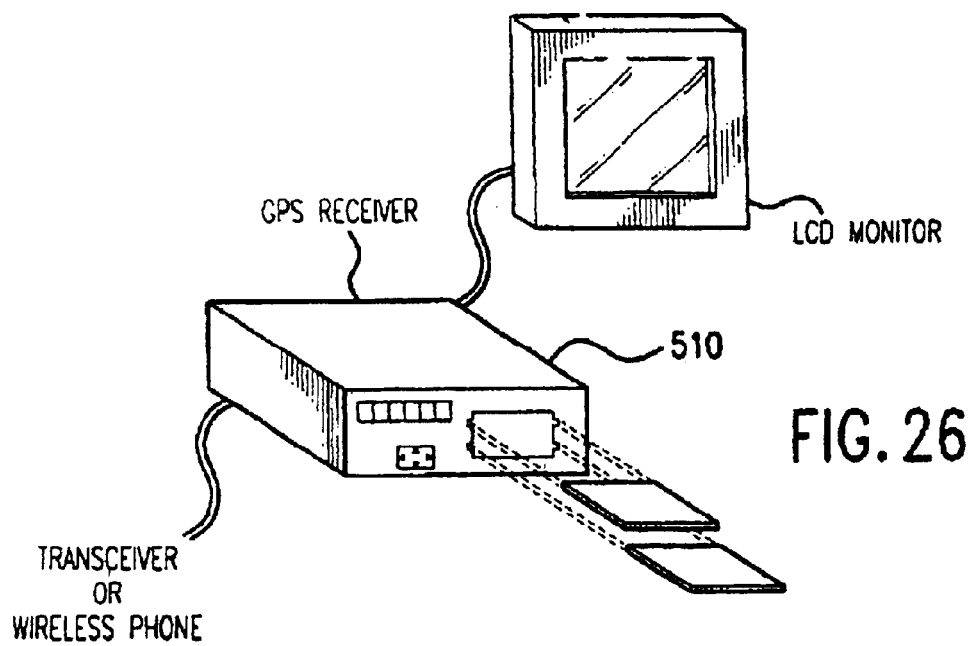
FIG. 26 shows an appearance design of the apparatus shown in FIG. 24 and 25 for furnishing automobiles

FIG. 26 shows an appearance design to furnish automobiles, where LCD monitor for furnishing automobiles is connected as a display and a phone on the move like a transceiver for automobiles or a cellular phone is connected as means for communication. A GPS receiver is connected for operations of a navigation system. The body is equipped with the input device. This appearance design improves the use on the movers such as automobiles.

Different assignments of the PIO and SIP to access the peripherals are allowed. Measure of these case is amendments of the drivers in agreement with the assignment.

Figure 27:
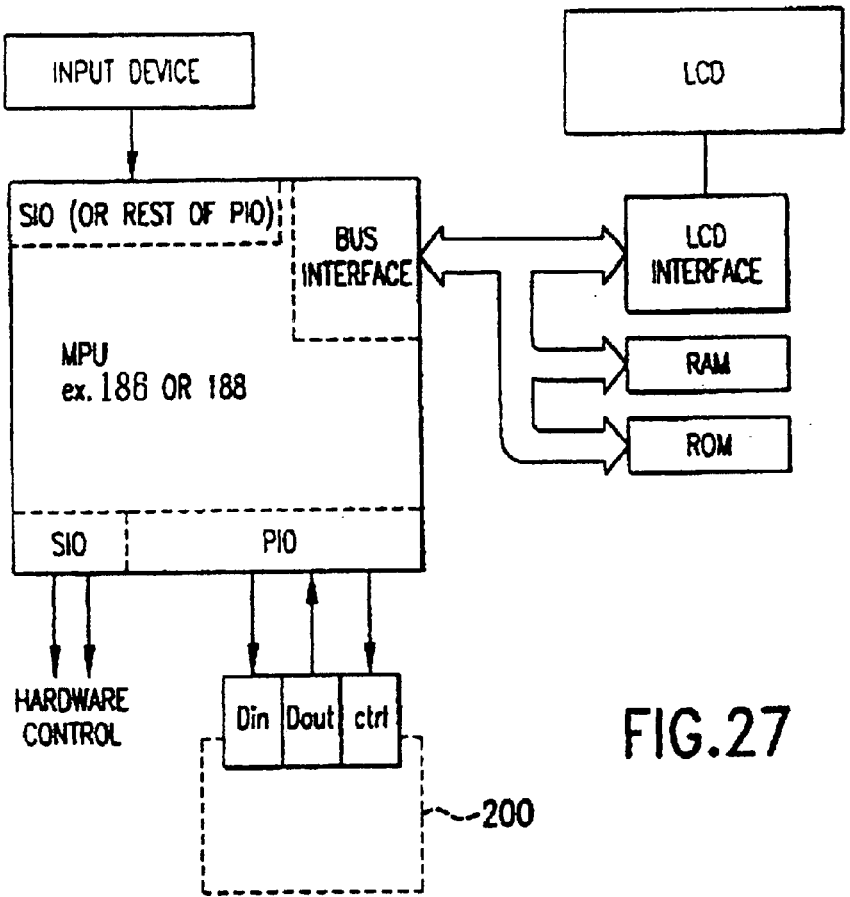
FIG. 27 shows a block diagram of the design around the MPU for such application.

The Microsoft's ATWork is well-known as a conception of the data exchange among office machines. This storage device of the present invention is also available for the ATWork. FIG. 27 shows a block diagram of the design around the MPU for such application.

On an equality with peripheries of an ordinary MPU, the bus interface is connected to the DRAMs and the ROMs and also LCD interface. And the input device is connected to the PIO or the SIO.

It is easy to execute operation of reading and writing data in the storage device 200 which is connected to the PTO of the MPU. Thus the data exchange among various office machines is achieved through the use of the storage devices 200.

The present inventions are not limited in the above-mentioned embodiments, and various modification may be allowed.

For example, it is assumed that it is an ordinary usage to connect the above-mentioned I/O expansion device to the parallel interface. However, the same operation will be obtained after extending registers having the same functions as those of the data register, control register and status registers in the personal computer, and connecting the extended registers to the I/O expansion device. And the body of the the personal computer may contain an extension board having a sequencer which works the I/O expansion devices to fulfil the operation of reading and writing data instead of the parallel interface. Further, a connector to connect the personal computer with the I/O expansion device is not limited to a shape of the 25-pin DSUB like a desktop computer.

The above system structures using the MPU having PIO (shown in FIGS. 23, 25, and 27) prove the basic structures of the system using removable storage devices with the memory. In the case of this basic, there are 8-bit ones which are allowed to be used as the extension circuit 100 for the storage devices 200 except the 4-bit one described above. For example, there are the Intel's 8255 or compatible chips and the Motorola's MC146823 or compatible chips which are allowed to be used for the extension circuit 100. In this case, data transfer is 8-bit parallel transfer. Pins Din and Dout are collected as a 8-bit data input/output pins. In the case of the 8-bit parallel transfer, data pins D0–D7 of the parallel interface are used for connecting the storage device to the parallel interface of the personal computer.

An operating system other than the Modular Windows, for example, Mac OS, is allowed to be stored in the ROM.

Accordingly, the scopes of the present inventions shall not be restricted to embodiments, and should be considered what the appended claims indicate.

As described above, according to the present inventions, writing and outputting 4-bit data to the selected input/output port or outputing the status of the selected input/output port from the data output to provide the status register is carried out by means of connecting the input-output extension unit to a parallel interface of the personal computer and the transition of the strobe status to provide a command through the first register for selecting one of input/output ports.

In this way, inputs/outputs of the personal computer are extended by the operation of selecting one of the input/output ports, and reading and writing the selected input/output port.

An external storage device is constructed by connecting the memory to input/output ports, where the operations of writing data into the memory and reading data in the memory with the personal computer are successfully carried out.

Further, the design having the access from the personal computer as a drive in the case that the input/output expantion devices of the present inventions provides a highly portable personal computer available for various purposes.

I claim:

1. A storage device comprising:
   a memory for storing data; and
   a circuit having a data input, a control input, and a data output;
   wherein the circuit provides an address input from the data input to the memory in accordance with a control signal from the control input to store data provided to the data input at the address in the memory or to output data at the address in the memory to the data output.

2. The storage device according to claim 1, wherein the circuit inputs a command from the data input to the memory in accordance with the control signal to store the data in the memory or to output data stored in the memory to the data output.

3. The storage device according to claim 1, wherein the circuit has ports for providing the data and the address to the memory and a data bus for transferring the data from the data input to one of the ports by the control signal of the control input.

4. The storage device according to claim 3, wherein the circuit has another data bus for transferring the data from the one of the ports to the data output by the control signal.

5. The storage device according to claim 3, wherein the ports comprise flip-flops for holding and outputting the data from the data bus to the memory by the control signal, and buffers for outputting the data from the memory to the data bus by the control signal.

6. The storage device according to claim 3, wherein selection and read/write of the ports is controlled by bits input to the control input.

7. The storage device according to claim 3, wherein the circuit inputs a command for selection and read/write of the ports from the data input by the control signal of the control input.

8. The storage device according to claim 3, wherein the circuit inputs part of the address from the data input to set the part to selected bit of a held address that is modified by the part, and provides the modified address to the memory.

9. The storage device according to claim 1, wherein the circuit inputs part of the data from the data input to set the part to selected bit of held data that is modified by the part, and provides the modified data to the memory.

10. The storage device according to claim 1, wherein the circuit has a readable port set to a status for identification and control of access to the memory.

11. The storage device according to claim 11, further comprising, a switch connected to the port for setting the status.

12. The storage device according to claim 1, further comprising, another memory for storing data to which the circuit provides the data.

13. The storage device according to claim 1, wherein data for identification in a predetermined header area is written in the memory.

14. The storage device according to claim 1, wherein the memory has a mode in which the data are successively output from the memory.

15. The storage device according to claim 1, wherein the memory is one of a ROM, a static memory, an EEPROM, a dynamic memory, a flash memory, and a ferroelectrics memory.

16. The storage device according to claim 1, wherein the data input inputs parallel data and the data output outputs parallel data.

17. The storage device according to claim 1, further comprising, a connector connected to the data input, the data output, and the control input, and for supplying power to the storage device.

18. A method for access to a storage device having a data input, a control input, a data output, and a memory for storing data, wherein the storage device provides an address from the data input to the memory in accordance with a control signal from the control input to store data provided to the data input at the provided address in the memory or to output data at the address in the memory to the data output, comprising:
providing an address to the data input to output the address to the memory;
providing data to the data input to output the data to the memory; and
providing a first control signal to the control input to store the data at the address into the memory.

19. The method according to claim 18, wherein the storage device inputs a command from the data input, and provides the data to the memory in accordance with the command to store the data in the memory or to output data in the memory to the data output, comprising:
providing the command to the data input;
providing data to the data input to output the data to the memory; and
providing the first control signal to the control input to store the data into the memory in accordance with the command.

20. The method according to claim 18, further comprising:
providing an address to the data input to set the address of memory; and
providing a second control signal to the control input to output the data at the address in the memory to the data output.

21. The method according to claim 18, further comprising, providing part of the address to set the part to selected bits of an address held in the storage device for modifying the address and output the modified address to the memory.

22. The method according to claim 18, wherein the data output outputs the data transfered between the data input and the memory, comprising:
inputting the transferred data from the data output to confirm whether the data is correct.

23. The method according to claim 18, wherein the memory has a mode in which the data are successively output from the memory, and the method further comprises turning control status of the memory by providing signals to the storage device such that the memory operates in the mode.

24. The method according to claim 18, wherein the storage device has a readable port set to a status for identification of an access type of the memory, comprising, reading the status to identify access type of the memory.

25. The method according to claim 18, wherein the data input inputs parallel data and the data output outputs parallel data.

26. An apparatus having (1) an interface for data exchange from and to a storage device having a data input, a control input, a data output, and a memory for storing data, wherein the storage device provides an address from the data input to the memory in accordance with a control signal from the control input to store data provided to the data input at the provided address in the memory or to output data at the address in the memory to the data output, and (2) a connector for connecting the data input, a data output and the control input to the interface and supplying power to the storage device, wherein the apparatus provides the control signal to the control input from the interface, and the data or an address to the data input from the interface to store the data at the address in the memory or to output data at the address in the memory to the data output.

27. The apparatus according to claim 28, wherein the storage device inputs a command from data input, provides the data to the memory in accordance with the command to store the data in the memory or to output data in the memory to the data output, and the apparatus provides the control signal to the control input from the interface, and the command and the data to the data input from the interface, to store the data in the memory or to output data in the memory to the data output.

28. The apparatus according to claim 26, wherein the apparatus provides part of the address to the data input to set the part to selected bits of an address held in the storage device for modifying the address and output the modified address to the memory.

29. The apparatus according to claim 26, wherein the memory has a mode in which the data are successively output from the memory, and the apparatus provides signals to the storage device such that the memory operates in the mode by turning control status of the memory.

30. The apparatus according to claim 26, wherein the apparatus exchanges data among a plurality of the storage devices, through the interface, and the apparatus further comprises connectors for connecting the data inputs of the storage devices to the interface and connecting the data inputs to each other.

31. The apparatus according to claim 26, wherein the data output outputs data transferred between the data input and the memory, and the apparatus inputs the transferred data from the data output to confirm whether the data is correct.

32. The apparatus according to claim 26, wherein the storage device has a readable port set to a status for identification and control of access to the memory, and the apparatus reads the status from the interface to identify access type of the memory.

33. The apparatus according to claim 26, wherein supplying power to the storage device is controlled.

34. The apparatus according to claim 26, wherein the data input inputs parallel data which the interface provides to the data input and the data output outputs parallel data which the interface inputs from the data output.

35. The apparatus according to claim 26, further comprising, a microcontoller in which the interface is provided.

36. An apparatus having (1) an interface for data exchange from and to the external storage device having a data input, a data output, a control input, and a memory provided an address from the data input in accordance with a control signal from the control input to output data at the provided address in the memory from the data output, and (2) a connector for connecting the data input, a data output and the control input to the interface and supplying power to the external storage device, wherein the apparatus provides the control signal to the control input, and changed part of the address to the data input from the interface to set the part to selected bits of the address held in the external storage device for modifying the address so that the external storage device outputs the data stored at the modified address in the memory from the data output.

37. An apparatus having (1) an interface for data exchange from and to the external storage device having a data input, a data output, a control input, and a memory provided an address from the data input in accordance with a control signal from the control input to output data at the provided address in the memory from the data output, wherein the memory has a mode in which the data are successively output from the memory, and (2) a connector for connecting the data input and the control input to the interface and supplying power to the external storage device, wherein the apparatus provides the control signal to the control input, and the address to the data input from the interface to output data at the address in the memory from the data output, and sets a value into the interface to turn control status of the memory such that the memory operates in the mode.

38. An apparatus having (1) an interface for data exchange from and to the external storage device having a data input, a data output, a control input, and a memory provided an address from the data input in accordance with a control signal from the control input to output data at the provided address in the memory from the data output, and a readable port set to a status for identification and control of access to the memory, and (2) a connector for connecting the data input and the control input to the interface and supplying power to the external storage device, wherein the apparatus reads the status from the interface to identify access of the memory, and provides the control signal to the control input, and the address to the data input from the interface to output the data at the address in the memory from the data output.

39. An apparatus having (1) an interface for data exchange from and to a storage device having a data input, a control input, a data output, and a memory for storing data, wherein the storage device inputs a command from the data input in accordance with a control signal from the control input to output data in the memory from the data output, and (2) a connector for connecting the data input, a data output and the control input to the interface and supplying power to the storage device, wherein the apparatus provides the control signal to the control input from the interface, and the command to the data input from the interface to output data in the memory from the data output.

* * * * *

UNITED STATES PATENT AND TRADEMARK OFFICE
CERTIFICATE OF CORRECTION

PATENT NO. : 6,952,742 B2  Page 1 of 2
APPLICATION NO. : 10/787116
DATED : October 4, 2005
INVENTOR(S) : Tadahiko Hisano It is certified that error appears in the above-identified patent and that said Letters Patent is hereby corrected as shown below:

On the title page delete the old fig. 19 and insert the new figure that is illustrated on the title page that is attached.

Claim 11 (in column 28 at line 49 to 51) should appear as follows:

11. The storage device according to claim 10, further comprising, a switch connected to the port for setting the status.

Claim 27 (column 30 at line 8 to 16) should appear as follows:

27. The apparatus according to claim 26, wherein the storage device inputs a command from the data input, provides the data to the memory in accordance with the command to store the data in the memory or to output data in the memory to the data output, and the apparatus provides the control signal to the control input from the interface, and the command and the data to the data input from the interface, to store the data in the memory or to output data in the memory to the data output.

Signed and Sealed this

Tenth Day of June, 2008

JON W. DUDAS
*Director of the United States Patent and Trademark Office*

(12) United States Patent
Hisano

(10) Patent No.: US 6,952,742 B2
(45) Date of Patent: Oct. 4, 2005

(54) EXTERNAL STORAGE DEVICE AND METHOD OF ACCESSING SAME

(76) Inventor: Tadahiko Hisano, 18-1 Hinomine, 4-chome, Kita-ku, Kobe-shi, Hyogo-ken (JP), 651-13

(*) Notice: Subject to any disclaimer, the term of this patent is extended or adjusted under 35 U.S.C. 154(b) by 0 days.

(21) Appl. No.: 10/787,116

(22) Filed: Feb. 27, 2004

(65) Prior Publication Data
US 2004/0167994 A1 Aug. 26, 2004

Related U.S. Application Data

(62) Division of application No. 10/197,479, filed on Jul. 18, 2002, now Pat. No. 6,735,638, which is a division of application No. 09/644,650, filed on Aug. 24, 2000, now Pat. No. 6,557,047, which is a division of application No. 08/913,170, filed as application No. PCT/JP96/00519 on Mar. 5, 1996, now Pat. No. 6,138,173.

(30) Foreign Application Priority Data

| Mar. 6, 1995 | (JP) | .................. 7-70452 |
|---|---|---|
| Aug. 16, 1995 | (JP) | .................. 7-231975 |
| Oct. 4, 1995 | (JP) | .................. 7-279866 |

(51) Int. Cl.$^7$ .................. G06F 13/14
(52) U.S. Cl. .................. 710/3; 710/13; 710/20; 710/33; 710/74; 710/300
(58) Field of Search .................. 710/2, 3, 13, 20, 710/33, 74, 300

(56) References Cited

U.S. PATENT DOCUMENTS

| 4,225,948 | A | * | 9/1980 | Schuller ........... 365/239 |
|---|---|---|---|---|
| 4,377,972 | A | | 3/1983 | O'Neil | |
| 4,667,088 | A | | 5/1987 | Kramer et al. | |
| 4,817,940 | A | | 4/1989 | Shaw et al. | |
| 5,196,994 | A | | 3/1993 | Tanuma et al. | |

(Continued)

FOREIGN PATENT DOCUMENTS

| JP | A-60-215267 | 10/1985 |
|---|---|---|
| JP | A-63-29871 | 2/1988 |
| JP | A-63-110947 | 7/1988 |
| JP | A-3-241417 | 10/1991 |
| JP | U-6-25938 | 4/1994 |
| JP | A-6-149431 | 5/1994 |
| JP | A-7-038741 | 1/1995 |
| JP | A-7-56659 | 3/1995 |
| JP | A-7-175747 | 7/1995 |
| WO | WO 93/23811 | 11/1993 |

OTHER PUBLICATIONS

80186/80188 Intel User's Manual (Nov., 1994).

P. Oguic, "Carte E/S externe pour port parallel", Electronique Radio Plans, No. 567, Feb. 1, 1994, pp. 43–47.

B.J. Freeman et al., "Microprocessor-to-microprocessor communications via an 8-bit data bus" IBM Technical Disclosure Bulletin., vol. 25, No. 10, Mar. 1983, pp. 5230–5235.

*Primary Examiner*—Rehana Perveen

(57) ABSTRACT

A storage device (200) has a memory and a circuit (100) which has a data input (Din), a control input (CTRL) and a data output (Dout), and provides an address input from the data input (Din) to the memory in accordance with a control signal from the control input (CTRL), so that the storage device (200) stores the data at the address in the memory or outputs data at the address in the memory to the data output (Dout). The apparatus provides the control signal to the control input (CTRL) from the interface (PORTS, P0, P1, P2), address and the data to the data input (Din) from the interface (PORTS, P0, P1, P2), to store the data at the address in the memory or to output data at the address in the memory to the data output (Dout). The apparatus may have a microcontroller (MPU) in which the interface (PORTS, P0, P1, P2) is provided.

39 Claims, 25 Drawing Sheets

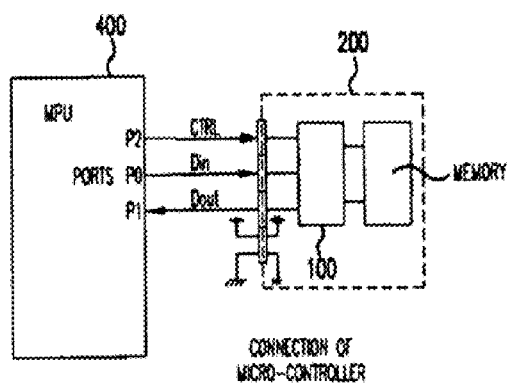

CONNECTION OF MICRO-CONTROLLER